United States Patent
Harada et al.

(10) Patent No.: US 8,396,498 B2
(45) Date of Patent: Mar. 12, 2013

(54) RADIO STATION, TRANSMITTING STATION, AND FREQUENCY BAND SHARING METHOD

(75) Inventors: Hiroki Harada, Kanagawa (JP);
Hiromasa Fujii, Kanagawa (JP);
Takahiro Asai, Kanagawa (JP);
Tomoyuki Ohya, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 174 days.

(21) Appl. No.: 12/832,139

(22) Filed: Jul. 8, 2010

(65) Prior Publication Data
US 2011/0009141 A1    Jan. 13, 2011

(30) Foreign Application Priority Data
Jul. 10, 2009    (JP) ................................. 2009-164244

(51) Int. Cl.
*H04B 7/01*    (2006.01)
(52) U.S. Cl. ......................... 455/509; 455/447; 455/450
(58) Field of Classification Search .................. 455/447, 455/450, 452.1, 452.2, 453, 509; 370/252, 370/278, 329
See application file for complete search history.

(56) References Cited

U.S. PATENT DOCUMENTS

| | | | |
|---|---|---|---|
| 6,351,649 B1 | 2/2002 | Watanabe et al. | |
| 6,618,427 B1 | 9/2003 | Yasaki | |
| 7,616,554 B2 | 11/2009 | Asai et al. | |
| 2006/0209746 A1 | 9/2006 | Asai et al. | |
| 2007/0183392 A1 | 8/2007 | Tandai et al. | |
| 2008/0214200 A1* | 9/2008 | Grandblaise et al. | 455/452.2 |
| 2009/0047971 A1* | 2/2009 | Fu | 455/450 |
| 2009/0238114 A1* | 9/2009 | Deshpande et al. | 370/328 |

FOREIGN PATENT DOCUMENTS

| | | |
|---|---|---|
| JP | 3572933 | 10/1999 |
| JP | 11340947 | 12/1999 |
| JP | 2003333648 | 11/2003 |
| JP | 2006222665 | 8/2006 |
| JP | 2007214819 | 8/2007 |
| WO | WO2009/068727 | * 6/2009 |

OTHER PUBLICATIONS

Japanese Patent Application No. 2009-164244, Japanese Office Action dated Aug. 9, 2011.
European Search Report dated Oct. 17, 2011 (EP10169040.2).

* cited by examiner

*Primary Examiner* — Tuan H. Nguyen
*Assistant Examiner* — Chung-Tien Yang
(74) *Attorney, Agent, or Firm* — MKG, LLC

(57) ABSTRACT

The invention has a step where a transmitting station in a second radio communication system determines whether transmission of a second radio communication system signal using a shared frequency band is possible or not based on load information of a first radio communication system broadcast from a base station in the first radio communication system, a step where the transmitting station in the second radio communication system calculates predicted interference power caused in a receiving station in the first radio communication system by the second radio communication system signal transmitted using the shared frequency band, and a step where the base station in the first radio communication system increases an allowable interference level of a first radio communication system signal transmitted using the shared frequency band based on the predicted interference power broadcast from the transmitting station in the second radio communication system.

5 Claims, 19 Drawing Sheets

RADIO STATION, TRANSMITTING STATION, AND FREQUENCY BAND SHARING METHOD

CROSS REFERENCE TO RELATED APPLICATION

This application is based upon and claims the benefit of priority from the prior Japanese Patent Application No. 2009-164244, filed on Jul. 10, 2009; the entire contents of which are incorporated herein by reference.

FIELD OF THE INVENTION

The present invention relates to a radio station in a first radio communication system using a shared frequency band which the first radio communication system uses in priority to a second radio communication system, a transmitting station in the second radio communication system, and a method of sharing the frequency band.

BACKGROUND

Conventionally, as a technique of sharing frequencies among a plurality of radio communication systems including a priority system and a non-priority system, such a technique is known that the non-priority system transmits a signal using a shared frequency band in accordance with the presence or absence of a signal of the priority system in the shared frequency band (for example, Japanese Unexamined Patent Publication No. 2006-222665).

More specifically, the non-priority system determines whether there is a signal from the priority system in the shared frequency band before transmitting a signal from the non-priority system. To prevent an interference in the priority system from causing by a transmission signal from the non-priority system, the non-priority system transmits a signal using the shared frequency band only when a signal from the priority system is not present.

However, in the above-mentioned conventional technique, even when the load of the priority system is allowable, the non-priority system does not transmit a signal in the case where a signal from the priority system exits. Therefore, a problem arises that although the load of the priority system is allowable, a transmission opportunity of a signal from the non-priority system is restricted.

Further, to increase the transmission opportunity from the non-priority system in the above-mentioned conventional technique, it is considered that the non-priority system transmits a signal even when a signal from the priority system exists. However, in this case, when a receiver in the priority system is located near a transmitter in the non-priority system, an interference level in the receiver in the priority system rapidly increases by a transmission signal from the non-priority system. Therefore, there is a problem that signal quality deteriorates in the priority system.

SUMMARY OF THE INVENTION

The present invention was made in view of such a respect, and it is an object of the invention to provide a radio station, a transmitting station and a frequency band sharing method for increasing transmission opportunities of signals in a non-priority system, while preventing signal quality from deteriorating in a priority system, when frequencies are shared among a plurality of radio communication systems including the priority system and non-priority system.

A radio station of the invention is a radio station for controlling a first radio communication system signal (uplink signal UL1 or downlink signal DL1) transmitted using a shared frequency band which the first radio communication system uses in priority to a second radio communication system, and is characterized by having a broadcast section (broadcast signal transmitting/receiving section 103) that broadcasts load information of the first radio communication system to a transmitting station in the second radio communication system, an acquisition section (broadcast signal transmitting/receiving section 103) that acquires predicted interference power caused in a receiving station in the first radio communication system by a second radio communication system signal that is transmitted using the shared frequency band from the transmitting station in the second radio communication system, and an allowable interference level control section (allowable interference level control section 104) that increases an allowable interference level of the first radio communication system signal transmitted using the shared frequency band, based on the predicted interference power acquired in the acquisition section.

According to this configuration, the broadcast section broadcasts the load information of the first radio communication system to the transmitting station in the second radio communication system, and it is thereby possible to increase the transmission opportunity of the second radio communication system signal transmitted from the transmitting station in the second radio communication system. Further, by increasing the allowable interference level of the first radio communication system signal based on the predicted interference power acquired in the acquisition section, it is possible to prevent the quality of the first radio communication system signal received in the receiving station in the first radio communication system from deteriorating due to the second radio communication system signal transmitted using the shared frequency band.

Further, in the radio station, the allowable interference level control section increases transmission power of the first radio communication system signal or decreases a transmission rate of the first radio communication system signal based on the predicted interference power acquired in the acquisition section.

Furthermore, it may be preferable that the radio station further has a frequency band switching section (resource allocation control section 106) that switches the frequency band of the first radio communication system signal from the shared frequency band to a dedicated frequency band of the first radio communication system, the acquisition section acquires priority information of the first radio communication system signal and the second radio communication system signal, and reception quality information of the first radio communication system signal in addition to the predicted interference power, and that the frequency band switching section switches the frequency band of the first radio communication system signal from the shared frequency band to the dedicated frequency band based on at least one of the priority information and the reception quality information.

Still furthermore, it may be preferable that in the radio station, the acquisition section acquires load information of the second radio communication system in addition to the predicted interference power, the priority information and the reception quality information, and that the frequency band switching section switches the frequency band of the first radio communication system signal from the shared frequency band to the dedicated frequency band based on at least one of the priority information, the reception quality information, and the load information of the second radio communication system.

Moreover, the radio station further can have an adjacent cell interference control section (adjacent cell interference control section 107) that decreases interference power caused in the receiving station in the first radio communication system by an adjacent cell based on the predicted interference power acquired in the acquisition section.

A transmitting station of the invention is a transmitting station (base station BS2 or mobile station MT2) for transmitting a second radio communication system signal (downlink signal DL2 or uplink signal UL2) to a receiving station in the second radio communication system using a shared frequency band which a first radio communication system uses in priority to the second radio communication system, and is characterized by having an acquisition section (broadcast signal transmitting/receiving section 201) that acquires load information of the first radio communication system, a transmission determining section (transmission determining section 202) that determines whether transmission of the second radio communication system signal using the shared frequency band is possible or not based on the load information acquired in the acquisition section, a predicted interference power calculating section (predicted interference power calculating section 204) that calculates predicted interference power caused in a receiving station (base station BS1 or mobile station MT1) in the first radio communication system by the second radio communication system signal transmitted using the shared frequency band, and a broadcast section (broadcast signal transmitting/receiving section 201) that broadcasts the predicted interference power calculated in the predicted interference power calculating section to the first radio communication system.

According to this configuration, by determining whether transmission of the second radio communication system signal using the shared frequency band is possible or not based on the load information of the first radio communication system acquired in the acquisition section, it is possible to increase the transmission opportunity of the second radio communication system signal transmitted from the transmitting station in the second radio communication system. Further, the broadcast section broadcasts the predicted interference power to the receiving station or transmitting station in the first radio communication system, and it is thereby possible to prevent the quality of the first radio communication system signal received in the receiving station in the first radio communication system from deteriorating due to the second radio communication system signal transmitted using the shared frequency band.

Further, the station can have a channel state estimating section (channel state estimating section 206) that estimates a channel state between the receiving station in the first radio communication system and the transmitting station, and that the transmission possibility determining section determines whether transmission of the second radio communication system signal using the shared frequency band is possible or not based on the load information acquired in the acquisition section and the channel state estimated in the channel state estimating section.

Furthermore, in the transmitting station, the broadcast section broadcasts priority information of the second radio communication system signal transmitted using the shared frequency band in addition to the predicted interference power.

Still furthermore, in the transmitting station, the broadcast section broadcasts load information of the second radio communication system in addition to the predicted interference power and the priority information.

A frequency band sharing method of the invention is a frequency band sharing method in which a first radio communication system and a second radio communication system share a shared frequency band which the first radio communication system uses in priority to the second radio communication system, and is characterized by having a step where a radio station in the first radio communication system broadcasts load information of the first radio communication system to a transmitting station in the second radio communication system, a step where the transmitting station in the second radio communication system determines whether transmission of a second radio communication system signal from the transmitting station using the shared frequency band is possible or not based on the broadcast load information of the first radio communication system, a step where the transmitting station in the second radio communication system calculates predicted interference power caused in a receiving station in the first radio communication system by the second radio communication system signal transmitted using the shared frequency band, a step where the transmitting station in the second radio communication system broadcasts the calculated predicted interference power to the radio station in the first radio communication system, and a step where the radio station in the first radio communication system increases an allowable interference level of a first radio communication system signal transmitted using the shared frequency band based on the broadcast predicted interference power.

It is possible to provide a radio station, transmitting station and frequency band sharing method for increasing transmission opportunities of signals in a non-priority system, while preventing signal quality from deteriorating in a priority system, when frequencies are shared among a plurality of radio communication systems including the priority system and non-priority system.

DETAILED DESCRIPTION

Embodiments of the invention will specifically be described below with reference to accompanying drawings.

Embodiment 1

Figure 1:
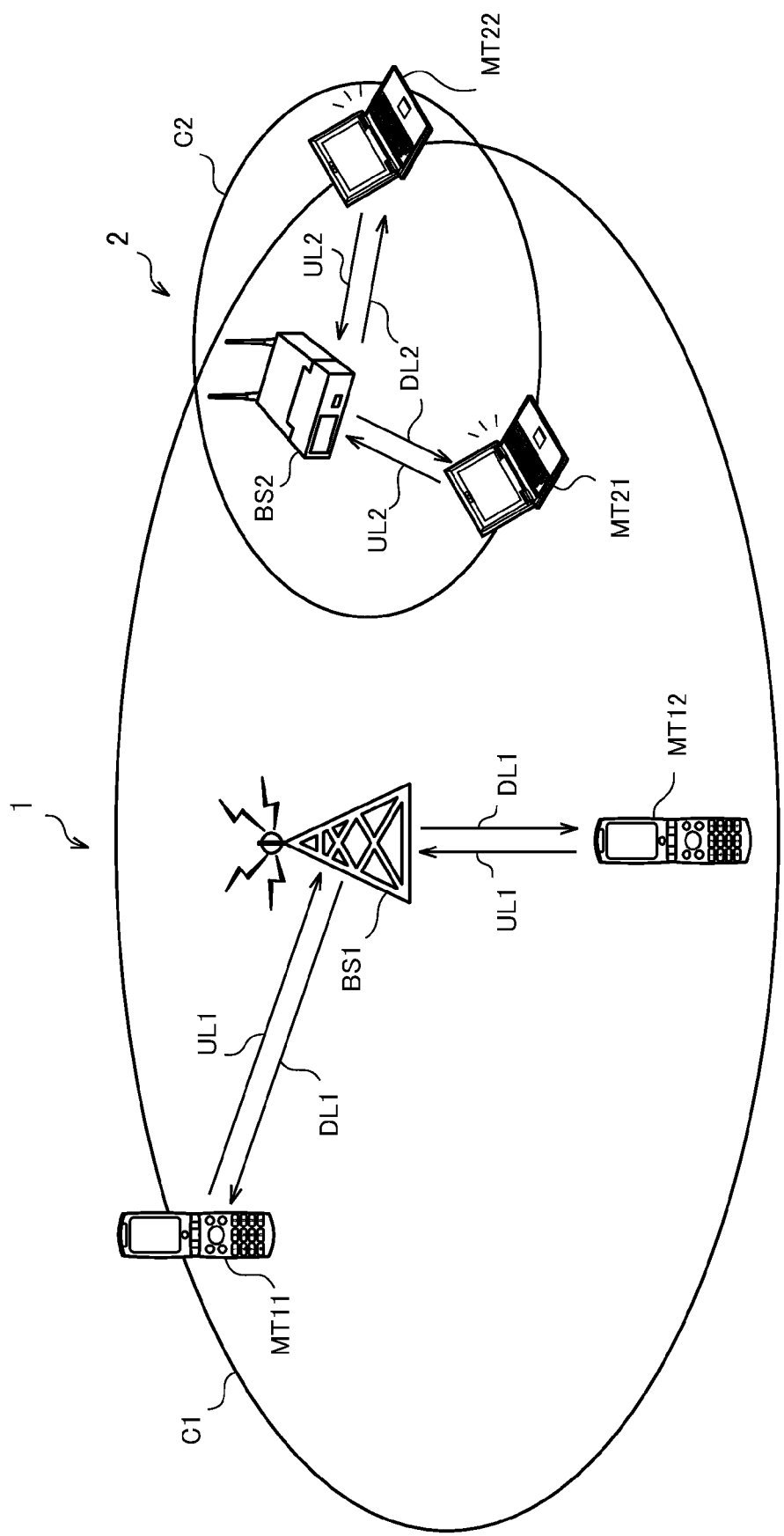
FIG. 1 is a schematic diagram of a radio communication system according to Embodiment 1 of the invention.

FIG. 1 is a schematic diagram of a radio communication system according to Embodiment 1 of the invention. As shown in FIG. 1, a radio communication system 1 and radio communication system 2 are operated in the same or adjacent areas.

Further, the radio communication system 1 and radio communication system 2 share the same or adjacent frequency bands. In use of the shared frequency band, the radio communication system 1 has a priority over the radio communication system 2. In other words, the radio communication system 1 is a priority system, and the radio communication system 2 is a non-priority system.

The radio communication system 1 is comprised of a base station BS1 and mobile stations MT11 and MT12. The base station BS1 receives uplink signals UL1 from the mobile stations MT11 and MT12 existing in a cell C1, while transmitting downlink signals DL1 to the mobile stations MT11 and MT12. The radio communication system 1 is a mobile communication system, for example. In addition, the mobile stations MT11 and MT12 in the radio communication system 1 have the same configuration, and therefore, are referred to as a mobile station MT1 except when they are distinguished. Further, a first radio communication system signal is a generic term for the downlink signal DL1 and uplink signal UL1. Furthermore, a radio station in the radio communication system 1 is a generic term for the base station BS1 and mobile station MT1.

The radio communication system 2 is comprised of a base station BS2 and mobile stations MT21 and MT22. The base station BS2 receives uplink signals UL2 from the mobile stations MT21 and MT22 existing in a cell C2, while transmitting downlink signals DL2 to the mobile stations MT21 and MT22. The radio communication system 2 is a mobile communication system or wireless LAN system, for example. In addition, the mobile stations MT21 and MT22 have the same configuration, and therefore, are referred to as a mobile station MT2 except when they are distinguished. Further, a second radio communication system signal is a generic term for the downlink signal DL2 and uplink signal UL2. Furthermore, a radio station in the radio communication system 2 is a generic term for the base station BS2 and mobile station MT2.

As described above, the radio communication system 1 and radio communication system 2 share the shared frequency band which the radio communication system 1 preferentially uses. Herein, it is assumed that the radio communication system 1 uses the shared frequency band in either the uplink signal UL1 or downlink signal DL1. Similarly, it is assumed that the radio communication system 2 uses the shared frequency band in either the uplink signal UL2 or downlink signal DL2.

In the following, Embodiment 1 describes the case where the shared frequency band is shared between the uplink signal UL1 in the radio communication system 1 and the downlink signal DL2 in the radio communication system 2. In this case, a receiving station in the radio communication system 1 is the base station BS1 that receives the uplink signal UL1, and a transmitting station in the radio communication system 2 is the base station BS2 that transmits the downlink signal DL2.

Figure 2:
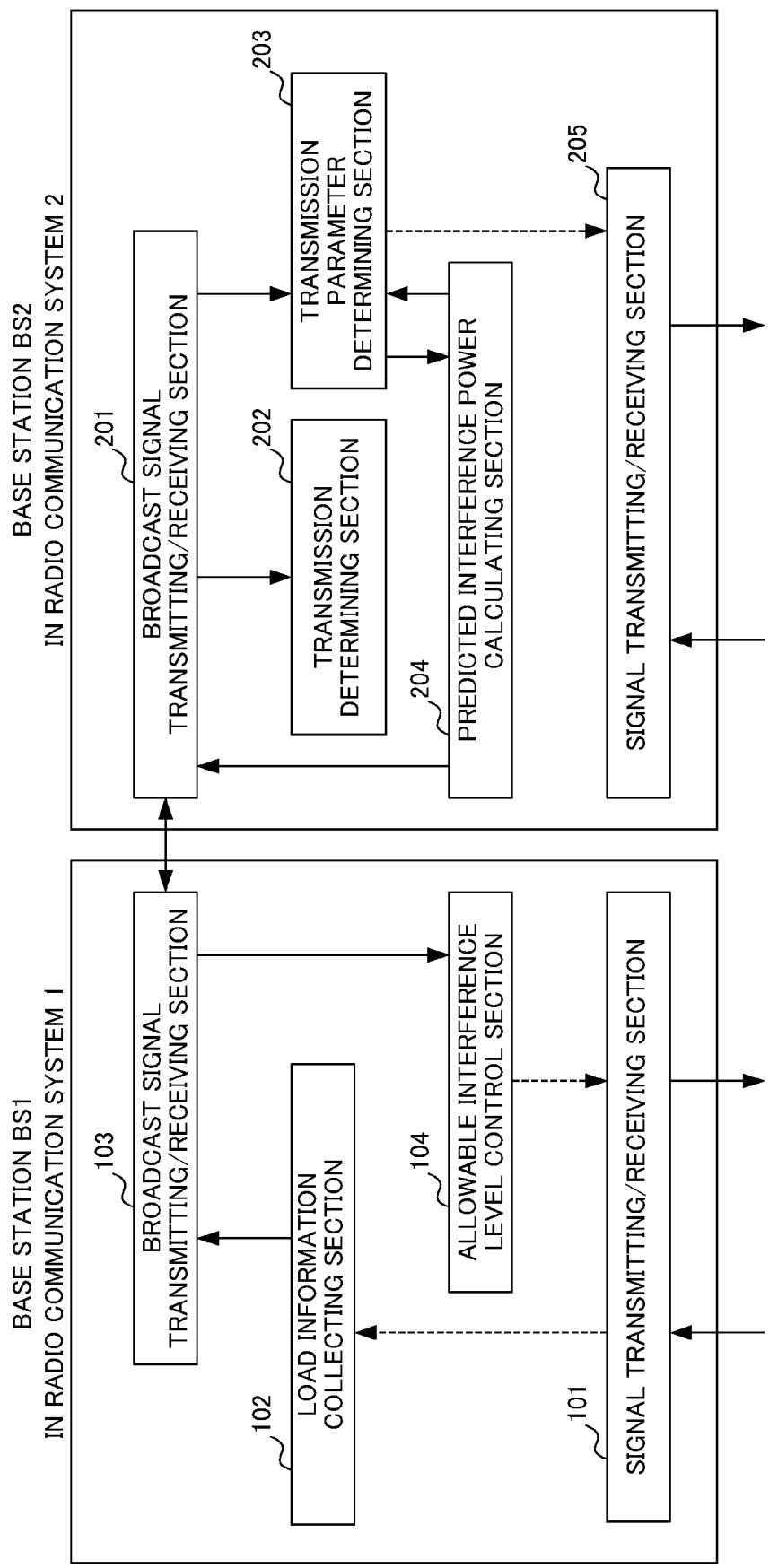
FIG. 2 is a configuration diagram of a base station according to Embodiment 1 of the invention.

FIG. 2 is a configuration diagram of the base station BS1 in the radio communication system 1 and the base station BS2 in the radio communication system 2. As shown in FIG. 2, the base station BS1 in the radio communication system 1 is provided with a signal transmitting/receiving section 101, load information collecting section 102, broadcast signal transmitting/receiving section 103, and allowable interference level control section 104.

The signal transmitting/receiving section 101 receives the uplink signal UL1 from the mobile station MT1. Further, the signal transmitting/receiving section 101 transmits the downlink signal DL1 to the mobile station, while transmitting an allowable interference control signal based on instructions from the allowable interference level control section 104 described later.

The load information collecting section 102 collects load information in the radio communication system 1. Herein, the load information includes a traffic amount of the cell of the BS1, traffic amounts of adjacent cells, reception quality information, etc. In Embodiment 1, since the shared frequency band is used in the uplink signal UL1, as the load information, the load information collecting section 102 collects the traffic amount of the uplink signal UL1, reception quality information of the uplink signal UL1, etc.

The broadcast signal transmitting/receiving section 103 (broadcast section, acquisition section) transmits and receives a broadcast signal to/from the base station BS2 in the radio communication system 2. The broadcast signal transmitted to the base station BS2 includes the load information collected in the load information collecting section 102. Further, the broadcast signal received from the base station BS2 includes predicted interference power caused in the base station BS1 by the downlink signal DL2 to be transmitted from the base station BS2 using the shared frequency band.

In addition, the broadcast signal transmitting/receiving section 103 may transmit and receive the broadcast signal via a backbone network connecting between the radio communication system 1 and the radio communication system 2, or may transmit and receive the broadcast signal via direct wireless communication between the base station BS1 and the base station BS2.

The allowable interference level control section 104 increases the allowable interference level of the uplink signal UL1 transmitted using the shared frequency band, based on the predicted interference power from the base station BS2. More specifically, the allowable interference level control section 104 instructs the mobile station MT1 to increase the transmission power of the uplink signal UL1 or decrease a transmission rate of the uplink signal UL1, based on the predicted interference power from the base station BS2.

Figure 3:
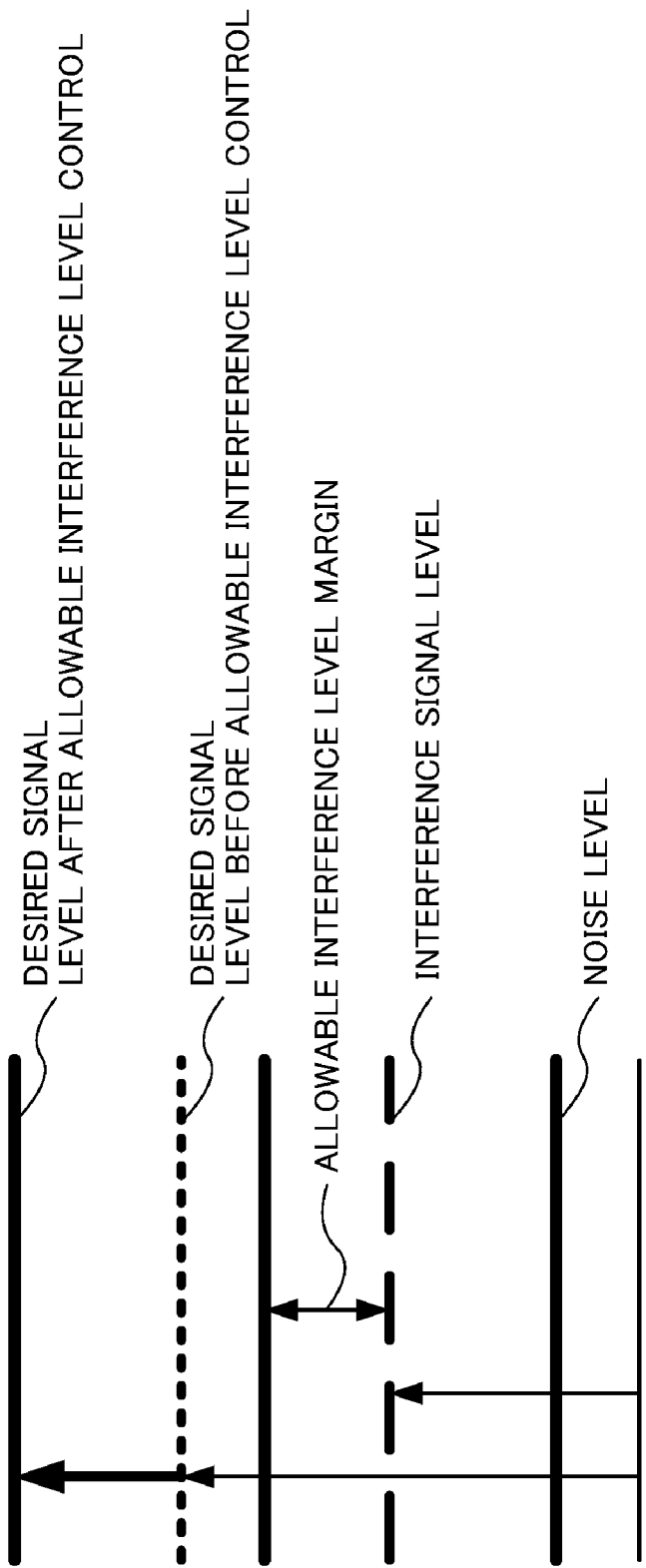
FIG. 3 is a diagram to explain allowable interference level control according to Embodiment 1 of the invention.

As shown in FIG. 3, when the allowable interference level is increased, even in the case where the interference signal level is increased by an allowable interference level margin due to the predicted interference power from the base station BS2, it is possible to maintain the signal to interference ratio (SIR) of the uplink signal UL1 at a certain level.

The base station BS2 (transmitting station) in the radio communication system 2 is provided with a broadcast signal transmitting/receiving section 201, transmission possibility determining section 202, transmission parameter determining section 203, predicted interference power calculating section 204, and signal transmitting/receiving section 205.

The broadcast signal transmitting/receiving section 201 (acquisition section, broadcast section) receives a broadcast signal including the load information from the base station BS1 in the radio communication system 1. Further, the broadcast signal transmitting/receiving section 201 transmits a broadcast signal including the predicted interference power calculated in the predicted interference power calculating section 204, described later, to the base station BS1 in the radio communication system 1.

The transmission possibility determining section 202 determines whether transmission of the downlink signal DL2 using the shared frequency band is possible or not based on the load information from the base station BS1. More specifically, the transmission possibility determining section 202 estimates an allowable interference level margin of the radio communication system 1 based on the load information, and determines whether or not the estimated allowable interference level margin is a predetermined value or more. The transmission possibility determining section 202 determines that it is possible to transmit the downlink signal DL2 when the allowable interference level margin of the radio communication system 1 is the predetermined value or more. The transmission possibility determining section 202 determines that it is not possible to transmit the downlink signal DL2 when the allowable interference level margin of the radio communication system 1 is less than the predetermined value.

The transmission parameter determining section 203 determines transmission parameters of the downlink signal DL2 from the base station BS2. More specifically, the transmission parameter determining section 203 determines the transmission power, modulation scheme, coding rate, etc. of the downlink signal DL2.

The predicted interference power calculating section 204 calculates the predicted interference power caused in the base station BS1 in the radio communication system 1 by the downlink signal DL2 to be transmitted using the shared frequency band, based on the transmission power of the downlink signal DL2 determined in the transmission parameter determining section 203.

The signal transmitting/receiving section 205 transmits the downlink signal DL2 to the mobile station MT2 according to the transmission parameters determined in the transmission parameter determining section 203. Further, the signal transmitting/receiving section 205 receives the uplink signal UL2 from the mobile station MT2.

The frequency band sharing processing according to Embodiment 1 will be described below with reference to FIGS. 4 and 5. In Embodiment 1, as described above, the shared frequency band is shared between the uplink signal UL1 in the radio communication system 1 and the downlink signal DL2 in the radio communication system 2, and the frequency band sharing processing is performed between the base station BS1 (receiving station) in the radio communication system 1 and the base station BS2 (transmitting station) in the radio communication system 2.

Figure 4:
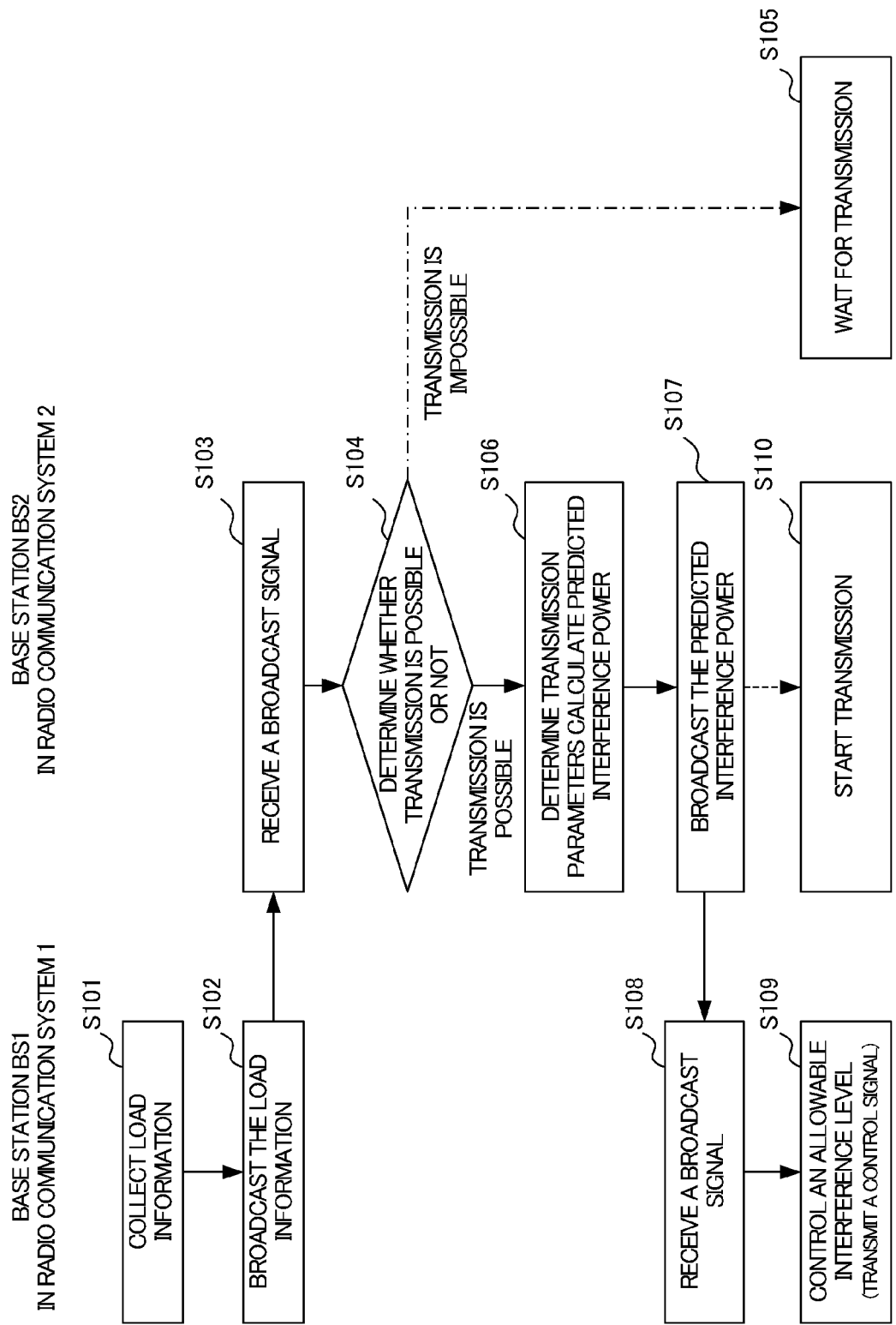
FIG. 4 is a flowchart illustrating frequency band sharing processing according to Embodiment 1 of the invention.
Figure 5:
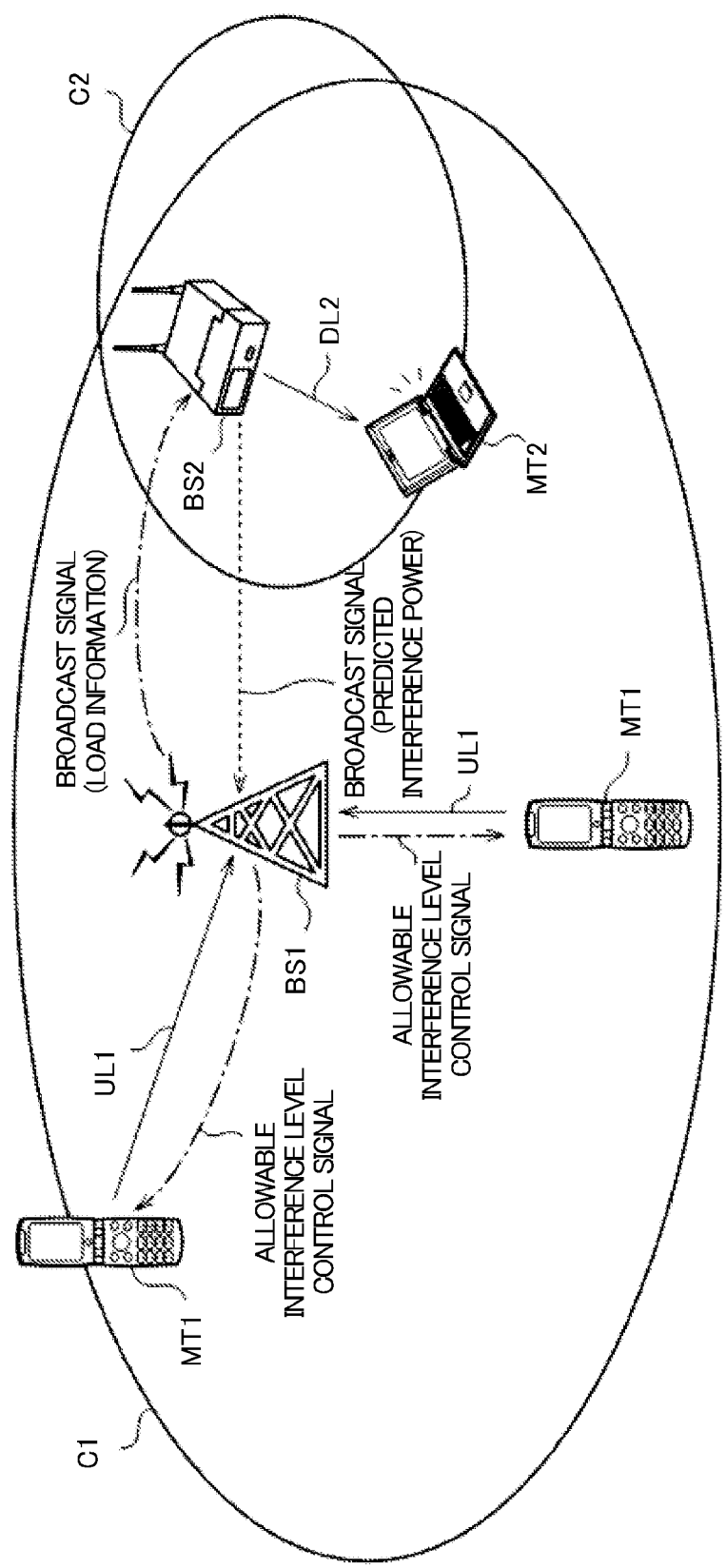
FIG. 5 is a diagram to explain a communication environment according to Embodiment 1 of the invention.

As shown in FIG. 4, the load information collecting section 102 in the base station BS1 collects the load information of the uplink signal UL1 (step S101).

The broadcast signal transmitting/receiving section 103 in the base station BS1 transmits a broadcast signal including the collected load information of the uplink signal UL1 to the base station BS2 (step S102). The broadcast signal transmitting/receiving section 201 in the base station BS2 receives the broadcast signal including the load information of the uplink signal UL1 from the base station BS1 (step S103).

The transmission determining section 202 in the base station BS2 determines whether transmission of the downlink signal DL2 is possible or not based on the load information of the uplink signal UL1 broadcast from the base station BS1 (step S104). More specifically, when the allowable interference level margin estimated based on the load information of the uplink signal UL1 is a predetermined value or more, the transmission determining section 202 determines that it is possible to transmit the downlink signal DL2. Meanwhile, when the allowable interference level margin is less than the predetermined value, the transmission determining section 202 determines that it is not possible to transmit the downlink signal DL2, and waits for transmission of the downlink signal DL2 (step S105).

When it is determined that the downlink signal DL2 can be transmitted, the transmission parameter calculating section 203 of the base station BS2 determines the transmission power of the downlink signal DL2. The predicted interference power calculating section 204 in the base station BS2 calculates the predicted interference power caused in the base station BS1 by the downlink signal DL2 to be transmitted using the shared frequency band, based on the determined transmission power of the downlink signal DL2 (step S106).

The broadcast signal transmitting/receiving section 201 in the base station BS2 transmits a broadcast signal including the predicted interference power calculated in step S106 to the base station BS1 (step S107). The broadcast signal transmitting/receiving section 103 in the base station BS1 receives the broadcast signal including the predicted interference power calculated in step S106 (step S108).

The allowable interference level control section 104 in the base station BS1 instructs the mobile station MT1 to increase the transmission power of the uplink signal UL1 or decrease a transmission rate of the signal UL1 based on the predicted interference power broadcast from the base station BS2 (step S109).

The signal transmitting/receiving section 205 in the base station BS2 transmits the downlink signal DL2 to the mobile station MT2 with the transmission power determined in step S106 (step S110).

According to the base station BS1 in the radio communication system 1 and the base station BS2 in the radio communication system 2 according to Embodiment 1, when a shared frequency band is shared between the uplink signal UL1 in the radio communication system 1 and the downlink signal DL2 in the radio communication system 2, it is determined whether or not transmission of the downlink signal DL2 from the base station BS2 is possible based on the load information of the uplink signal UL1 collected in the base station BS1, and it is thereby possible to increase the transmission opportunity of the downlink signal DL2 from the base station BS2.

Further, the base station BS1 increases the allowable interference level of the uplink signal UL1 based on the predicted interference power broadcast from the base station BS2, and it is thereby possible to prevent the quality of the uplink signal UL1 received in the base station BS1 from deteriorating due to interference from the downlink signal DL2 transmitted from the base station BS2.

(Modification 1-1)

Modification 1-1 in Embodiment 1 describes the case where a shared frequency band is shared between the uplink signal UL1 in the radio communication system 1 and the uplink signal UL2 in the radio communication system 2.

Figure 6:
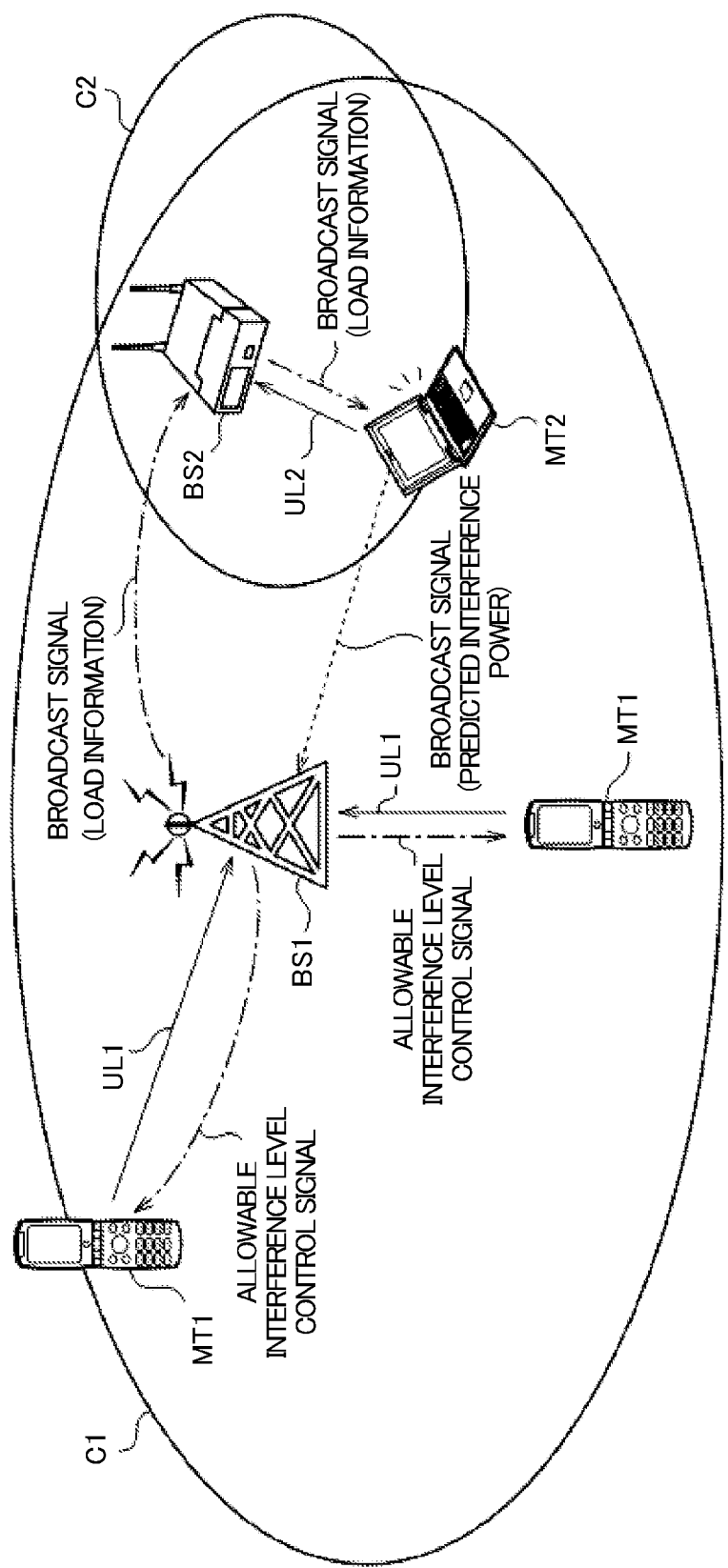
FIG. 6 is a diagram to explain a communication environment according to Modification 1-1 of the invention.

Referring to FIG. 6, the frequency band sharing processing according to Modification 1-1 will be described, while focusing on the difference from the frequency band sharing processing in above-mentioned Embodiment 1. In Modification 1-1, the mobile station MT2 is provided with the configuration of the base station BS2 as shown in FIG. 2, and the above-mentioned frequency band sharing processing is performed between the base station BS1 (receiving station) in the radio communication system 1 and the mobile station MT2 (transmitting station) in the radio communication system 2.

More specifically, as shown in FIG. 6, the mobile station MT2 in the radio communication system 2 receives a broadcast signal transmitted from the base station BS1 in the radio communication system 1 via the base station BS2. The mobile station MT2 determines whether or not transmission of the uplink signal UL2 is possible based on the load information of the uplink signal UL1 included in the broadcast signal. The mobile station MT2 determines the transmission power of the uplink signal UL2 when determining that it is possible to the signal UL2. The mobile station MT2 calculates the predicted interference power caused in the base station BS1 by the uplink signal UL2 to be transmitted using the shared frequency band, based on the determined transmission power of the uplink signal UL2. The mobile station MT2 transmits a broadcast signal including the calculated predicted interference power to the base station BS1 in the radio communication system 1.

The base station BS1 in the radio communication system 1 transmits an allowable interference level control signal to the mobile station MT1. The base station BS1 instructs the mobile station MT1 to increase the transmission power of the uplink signal UL1 or decrease a transmission rate of the uplink signal UL1 based on the predicted interference power broadcast from the mobile station MT2, using the allowable interference level control signal.

According to the base station BS1 in the radio communication system 1 and the mobile station MT2 in the radio communication system 2 according to Modification 1-1, when a shared frequency band is shared between the uplink signal UL1 in the radio communication system 1 and the uplink signal UL2 in the radio communication system 2, it is determined whether transmission of the uplink signal UL2 from the mobile station MT2 is possible or not based on the load information of the uplink signal UL1 collected in the base station BS1, and it is thereby possible to increase the transmission opportunity of the uplink signal UL2 from the mobile station MT2.

Further, the base station BS1 increases the allowable interference level of the uplink signal UL1 based on the predicted interference power broadcast from the mobile station MT2, and it is thereby possible to prevent the quality of the uplink signal UL1 received in the base station BS1 from deteriorating due to interference from the uplink signal UL2 transmitted by the mobile station MT2.

(Modification 1-2)

Modification 1-2 in Embodiment 1 describes the case where a shared frequency band is shared between the downlink signal DL1 in the radio communication system 1 and the downlink signal DL2 in the radio communication system 2.

Figure 7:
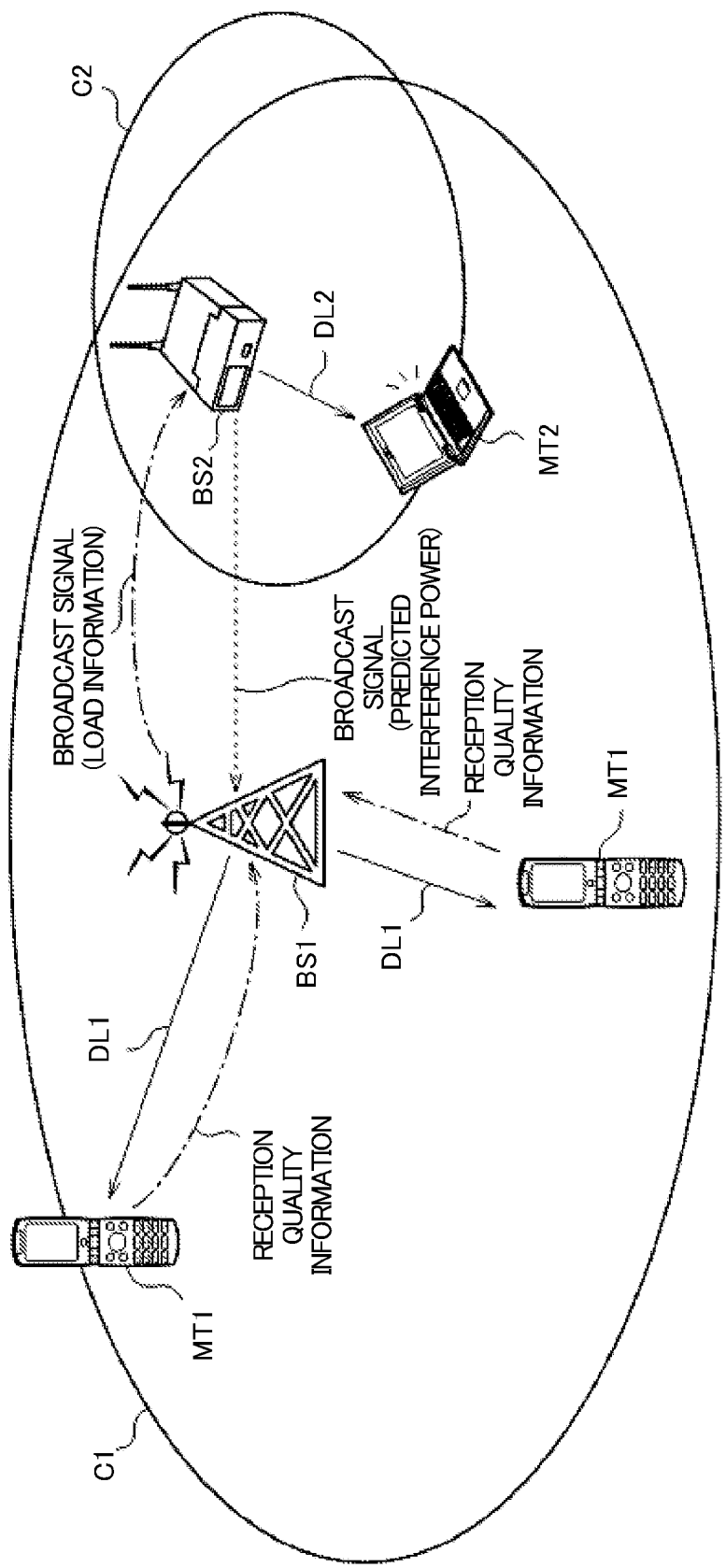
FIG. 7 is a diagram to explain a communication environment according to Modification 1-2 of the invention.

Referring to FIG. 7, the frequency band sharing processing according to Modification 1-2 will be described, while focusing on the difference from the frequency band sharing processing in above-mentioned Embodiment 1. In Modification 1-2, the above-mentioned frequency band sharing processing is performed between the base station BS1 (transmitting station) in the radio communication system 1 and the base station BS2 (transmitting station) in the radio communication system 2.

More specifically, as shown in FIG. 7, the base station BS1 in the radio communication system 1 collects reception quality information of the downlink signal DL1 from each mobile station MT1. The base station BS1 transmits to the base station BS2 a broadcast signal including all of the collected reception quality information or an average value of the collected reception quality information as the load information of the downlink signal DL1.

The base station BS2 receiving the broadcast signal calculates the predicted interference power caused in the mobile station MT1 by the downlink signal DL2 to be transmitted using the shared frequency band, and transmits a broadcast signal including the calculated predicted interference power to the base station BS1.

The base station BS1 performs allowable interference level control for increasing the transmission power of the downlink signal DL1 to the mobile station MT1 or decreasing the transmission rate of the signal DL1, based on the predicted interference power broadcast from the base station BS2.

According to the base station BS1 in the radio communication system 1 and the base station BS2 in the radio communication system 2 according to Modification 1-2, when a frequency band is shared between the downlink signal DL1 in the radio communication system 1 and the downlink signal DL2 in the radio communication system 2, it is determined whether transmission of the downlink signal DL2 from the base station BS2 is possible or not based on the load information of the downlink signal DL1 collected in the base station BS1, and it is thereby possible to increase the transmission opportunity of the downlink signal DL2 from the base station BS2.

Further, the base station BS1 increases the allowable interference level of the downlink signal DL1 based on the predicted interference power broadcast from the base station BS2, and it is thereby possible to prevent the quality of the downlink signal DL1 received in the mobile station MT1 from deteriorating due to interference from the downlink signal DL2 transmitted by the base station BS2.

(Modification 1-3)

Modification 1-3 in Embodiment 1 describes the case where a frequency band is shared between the downlink signal DL1 in the radio communication system 1 and the uplink signal UL2 in the radio communication system 2.

Figure 8:
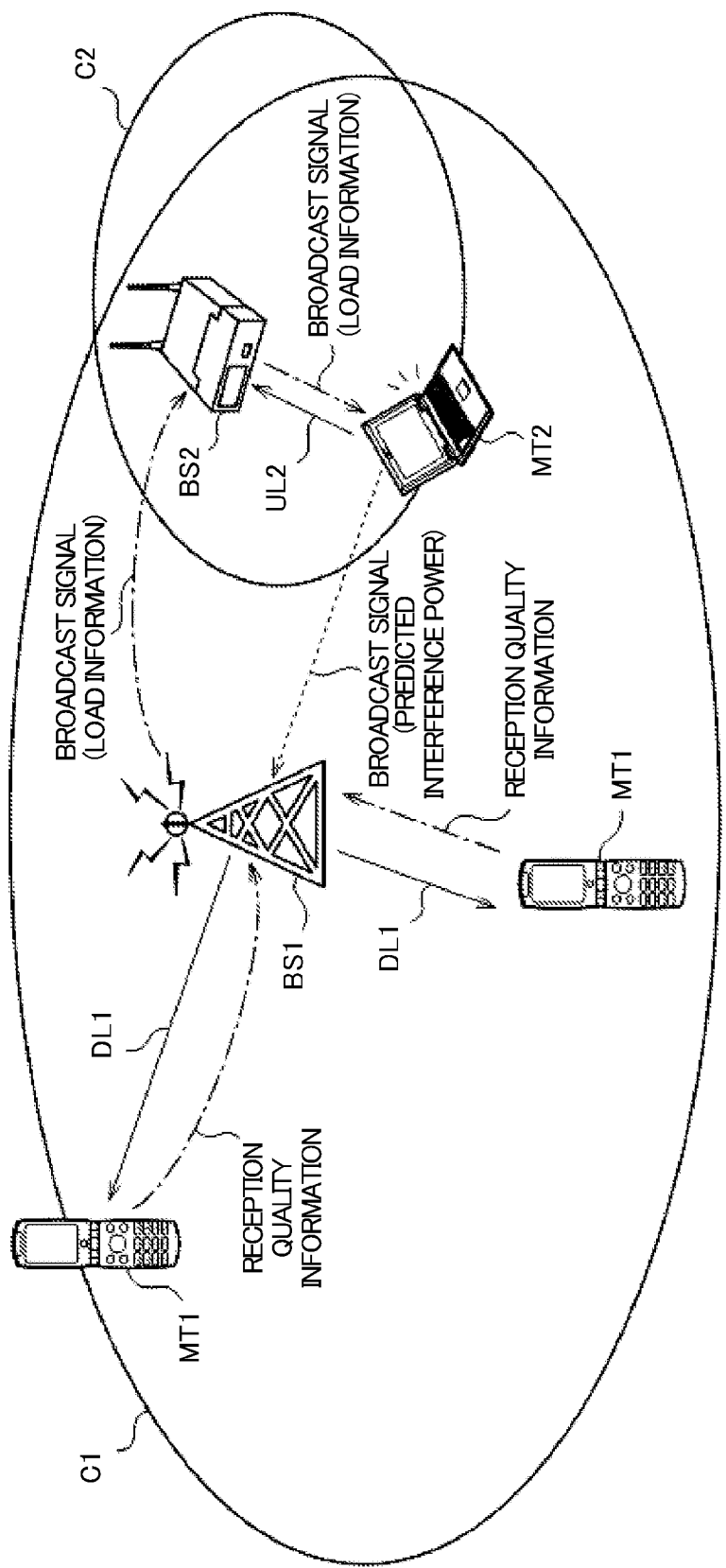
FIG. 8 is a diagram to explain a communication environment according to Modification 1-3 of the invention.

Referring to FIG. 8, the frequency band sharing processing according to Modification 1-3 will be described, while focusing on the difference from Modification 1-1 and Modification 1-2. In Modification 1-3, the mobile station MT2 is provided with the configuration of the base station BS2 as shown in FIG. 2, and the above-mentioned frequency band sharing processing is performed between the base station BS1 (transmitting station) in the radio communication system 1 and the mobile station MT2 (transmitting station) in the radio communication system 2.

As shown in FIG. 8, the mobile station MT2 in the radio communication system 2 calculates the predicted interference power caused in the mobile station MT1 by the uplink signal UL2 to be transmitted from the mobile station MT2 using the shared frequency band, as described in Modification 1-1. The mobile station MT2 broadcasts the calculated predicted interference power to the base station BS1.

The base station BS1 in the radio communication system 1 increases the transmission power of the downlink signal DL1 to the mobile station MT1 or decreases the transmission rate of the downlink signal DL1 based on the predicted interference power broadcast from the base station BS2, as described in Modification 1-2.

According to the base station BS1 in the radio communication system 1 and the mobile station MT2 in the radio communication system 2 according to Modification 1-3, when a frequency band is shared between the downlink signal DL1 in the radio communication system 1 and the uplink signal UL2 in the radio communication system 2, it is determined whether transmission of the uplink signal UL2 from the mobile station MT2 is possible or not based on the load information of the downlink signal DL1 collected in the base station BS1, and it is thereby possible to increase the transmission opportunity of the uplink signal UL2 from the mobile station MT2.

Further, the base station BS1 increases the allowable interference level of the downlink signal DL1 based on the predicted interference power broadcast from the mobile station MT2, and it is thereby possible to prevent the quality of the downlink signal DL1 received in the mobile station MT1 from deteriorating due to interference from the uplink signal UL2 transmitted by the mobile station MT2.

Embodiment 2

Figure 9:
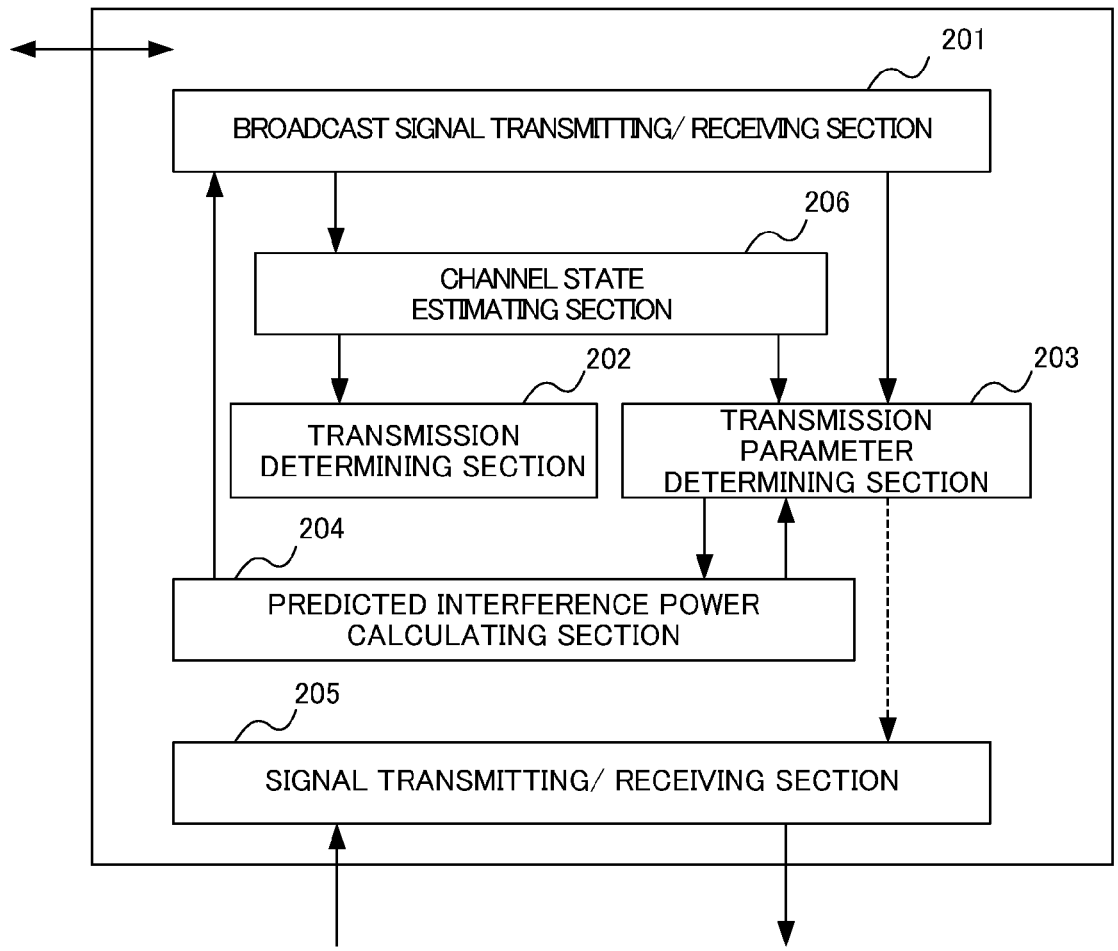
FIG. 9 is a configuration diagram of a base station according to Embodiment 2 of the invention.

Referring to FIG. 9, the base station BS2 in the radio communication system 2 according to Embodiment 2 of the invention will be described below, while focusing on the difference from that in Embodiment 1.

In the following, Embodiment 2 describes the case where a shared frequency band is shared between the uplink signal UL1 in the radio communication system 1 and the downlink signal DL2 in the radio communication system 2 (see FIG. 5).

As shown in FIG. 9, the base station BS2 in the radio communication system 2 has a channel state estimating section 206, and in this respect, differs from that in Embodiment 1.

The channel state estimating section 206 in the base station BS2 estimates a channel state between the base station BS1 (receiving station) in the radio communication system 1 and the base station BS2 (transmitting station) in the radio communication system 2. For example, the channel state estimating section 206 estimates the channel state between the base station BS1 and base station BS2 based on the reception strength of a broadcast signal transmitted from the base station BS1. Further, the channel state estimating section 206 may estimate the aforementioned channel state based on the reception strength of a known symbol from the base station BS1.

Figure 10:
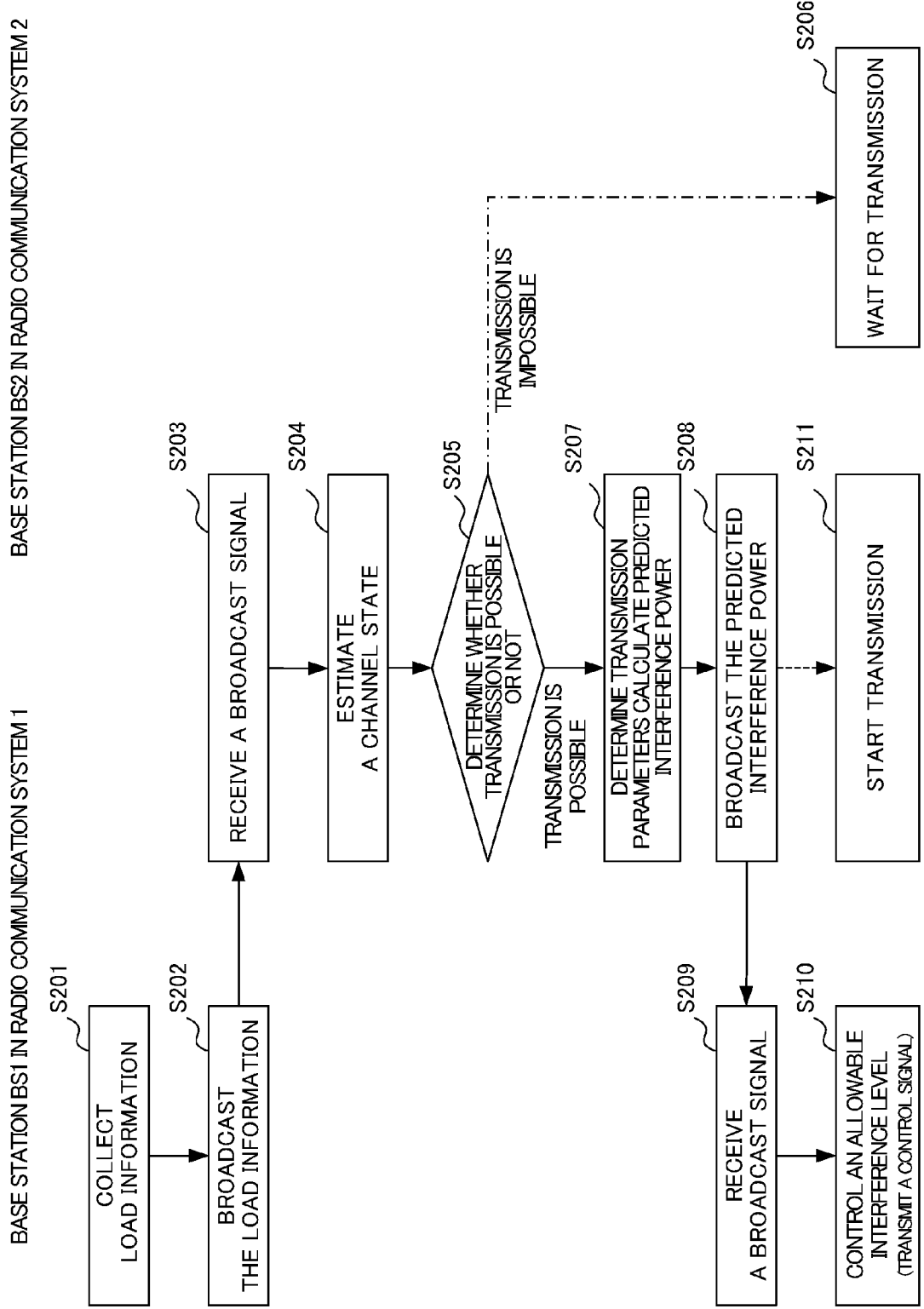
FIG. 10 is a flowchart illustrating frequency band sharing processing according to Embodiment 2 of the invention.

The frequency band sharing processing according to Embodiment 2 will be described below with reference to FIG. 10. In Embodiment 2, the frequency band sharing processing is performed between the base station BS1 (receiving station) in the radio communication system 1 and the base station BS2 (transmitting station) in the radio communication system 2. In addition, steps S201 to S203 are the same as steps S101 to S103 in FIG. 4, and descriptions thereof are omitted.

As described above, the channel state estimating section 206 in the base station BS2 estimates the channel state between the base station BS1 and base station BS2 (step S204).

The transmission determining section 202 in the base station BS2 determines whether transmission of the downlink signal DL2 is possible or not based on the load information broadcast from the base station BS1 and the estimated channel state between the base station BS1 and base station BS2 (step S205). More specifically, the transmission determining section 202 determines whether or not the mobile station MT1 that transmits the uplink signal UL1 exists near the base station BS2, based on the channel state between the base station BS1 and base station BS2.

For example, even when the allowable interference level margin of the radio communication system 1 that is estimated based on the load information is a predetermined value or more, in the case where the transmission determining section 202 determines that the mobile station MT1 that transmits the uplink signal UL1 exists near the base station BS2, the section 202 determines that it is not possible to transmit the downlink signal DL2, and waits for transmission of the downlink signal DL2 (step S206).

When determining that it is possible to transmit the downlink signal DL2, the transmission parameter determining section 203 in the base station BS2 determines the transmission power of the downlink signal DL2 based on the estimated channel state. The predicted interference power calculating section 204 calculates the predicted interference power caused in the base station BS1 by the downlink signal DL2 to be transmitted using the shared frequency band, based on the transmission power of the downlink signal DL2 determined in the transmission parameter determining section 203 (step S207). Steps S208 to S211 are the same as steps S107 to S110 in FIG. 4, and descriptions thereof are omitted.

According to the base station BS2 in the radio communication system 2 according to Embodiment 2, when a shared frequency band is shared between the uplink signal UL1 in the radio communication system 1 and the downlink signal DL2 in the radio communication system 2, it is determined whether transmission of the downlink signal DL2 from the base station BS2 is possible or not based on the channel state between the base station BS1 and base station BS2, in addition to the load information collected in the base station BS1. Therefore, when the mobile station MT1 that transmits the uplink signal UL1 exists near the base station BS2, it is possible to prevent the quality of the uplink signal UL1 transmitted from the mobile station MT1 from deteriorating due to interference from the downlink signal DL2 transmitted from the base station BS2.

(Modification 2-1)

Modification 2-1 in Embodiment 2 describes the case where a frequency band is shared between the uplink signal UL1 in the radio communication system 1 and the uplink signal UL2 in the radio communication system 2 (see FIG. 6), while focusing on the difference from Embodiment 2.

In the frequency band sharing processing according to Modification 2-1, the mobile station MT2 (transmitting station) is provided with the configuration of the base station BS2 as shown in FIG. 9. The channel state estimating section 206 in the mobile station MT2 estimates a channel state between the base station BS1 (receiving station) in the radio communication system 1 and the mobile station MT2 (transmitting station) in the radio communication system 2. For example, the channel state estimating section 206 estimates the above-mentioned channel state based on the reception strength of a known symbol from the base station BS1.

The transmission determining section 202 in the mobile station MT2 determines whether transmission of the uplink signal UL2 from the mobile station MT2 is possible or not based on the load information from the base station BS1 and the estimated channel state.

According to the mobile station MT2 in the radio communication system 2 according to Modification 2-1, when a frequency band is shared between the uplink signal UL1 in the radio communication system 1 and the uplink signal UL2 in the radio communication system 2, it is determined whether transmission of the uplink signal UL2 from the mobile station MT2 is possible or not based on the channel state between the base station BS1 and mobile station MT2, in addition to the load information collected in the base station BS1. Therefore, when the mobile station MT1 that transmits the uplink signal UL1 exists near the mobile station MT2, it is possible to prevent the quality of the uplink signal UL1 transmitted from the mobile station MT1 from deteriorating due to interference from the uplink signal UL2 transmitted from the mobile station MT2.

(Modification 2-2)

Modification 2-2 in Embodiment 2 describes the case where a frequency band is shared between the downlink signal DL1 in the radio communication system 1 and the downlink signal DL2 in the radio communication system 2 (see FIG. 7), while focusing on the difference from Embodiment 2.

In the frequency band sharing processing according to Modification 2-2, the channel state estimating section 206 in the base station BS2 estimates a channel state between the mobile station MT1 (receiving station) in the radio communication system 1 and the base station BS2 (transmitting station) in the radio communication system 2. For example, the channel state estimating section 206 in the base station BS2 estimates the channel state based on a known symbol of an uplink transmission signal from the mobile station MT1. The transmission determining section 202 in the base station BS2 determines whether transmission of the downlink signal DL2 from the base station BS2 is possible or not based on the load information broadcast from the base station BS1 and the estimated channel state.

According to the base station BS2 in the radio communication system 2 according to Modification 2-2, when a frequency band is shared between the downlink signal DL1 in the radio communication system 1 and the downlink signal DL2 in the radio communication system 2, it is determined whether transmission of the downlink signal DL2 from the base station BS2 is possible or not based on the channel state between the mobile station MT1 and base station BS2, in addition to the load information collected in the base station BS1. Therefore, when the base station BS1 that transmits the downlink signal DL1 exists near the base station BS2, it is possible to prevent the quality of the downlink signal DL1 transmitted from the base station BS1 from deteriorating due to interference from the downlink signal DL2 transmitted from the base station BS2.

(Modification 2-3)

Modification 2-3 in Embodiment 2 describes the case where a frequency band is shared between the downlink signal DL1 in the radio communication system 1 and the uplink signal UL2 in the radio communication system 2 (see FIG. 8), while focusing on the difference from Embodiment 2.

In the frequency band sharing processing according to Modification 2-3, the mobile station MT2 (transmitting station) is provided with the configuration of the base station BS2 as shown in FIG. 9. The channel state estimating section 206 in the mobile station MT2 estimates a channel state between the mobile station MT1 (receiving station) in the radio communication system 1 and the mobile station MT2 (transmitting station) in the radio communication system 2. For example, the channel state estimating section 206 in the mobile station MT2 estimates the channel state based on a known symbol of an uplink transmission signal from the mobile station MT1. The transmission determining section 202 in the mobile station MT2 determines whether transmission of the uplink signal UL2 from the mobile station MT2 is possible or not based on the broadcast load information and the estimated channel state.

According to the mobile station MT2 in the radio communication system 2 according to Modification 2-3, when a frequency band is shared between the downlink signal DL1 in the radio communication system 1 and the uplink signal UL2 in the radio communication system 2, it is determined whether transmission of the uplink signal UL2 from the mobile station MT2 is possible or not based on the channel state between the mobile station MT1 and mobile station MT2, in addition to the load information collected in the base station BS1. Therefore, when the base station BS1 that transmits the downlink signal DL1 exists near the mobile station MT2, it is possible to prevent the quality of the downlink signal DL1 transmitted from the base station BS1 from deteriorating due to interference from the uplink signal UL2 transmitted from the mobile station MT2.

Embodiment 3

Figure 11:
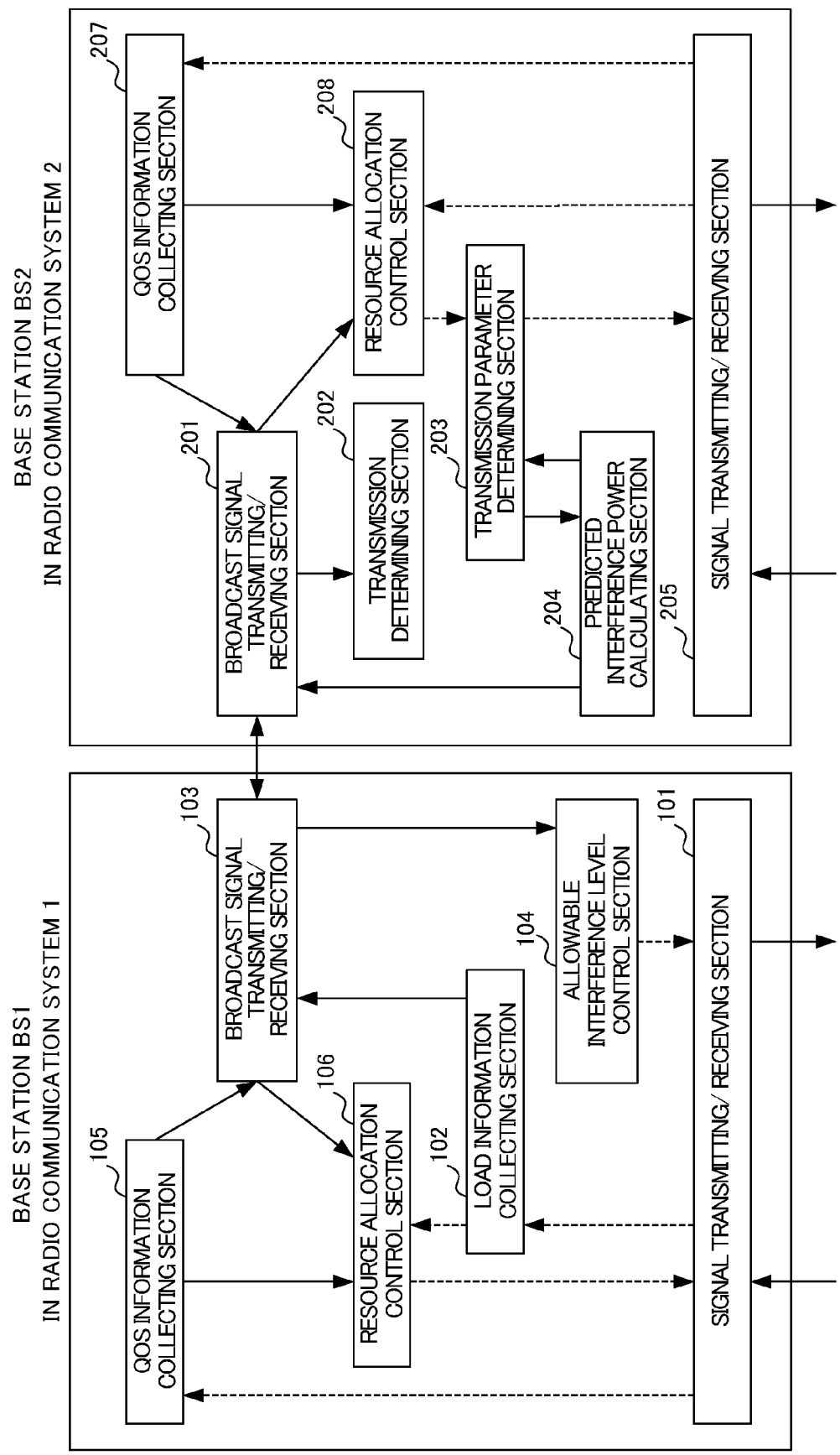
FIG. 11 is a configuration diagram of a base station according to Embodiment 3 of the invention.

Referring to FIG. 11, described next are the base station BS1 in the radio communication system 1 and the base station BS2 in the radio communication system 2 according to Embodiment 3 of the invention, while focusing on differences from those in Embodiment 1.

In the following, Embodiment 3 describes the case where a frequency band is shared between the uplink signal UL1 in the radio communication system 1 and the downlink signal DL2 in the radio communication system 2 (see FIG. 5).

As shown in FIG. 11, the base station BS1 in the radio communication system 1 has a QoS information collecting section 105 and resource allocation control section 106, and in this respect, differs from that in Embodiment 1.

The QoS information collecting section 105 in the base station BS1 collects priority information in the radio communication system 1. Herein, the priority information is a priority of a signal indicated by the QoS information. In Embodiment 3, since a shared frequency band is used in the uplink signal UL1, the QoS information collecting section 105 collects the priority information of the uplink signal UL1.

The resource allocation control section 106 (frequency band switching section) in the base station BS1 performs resource allocation control of the uplink signal UL1 based on at least one of the priority information of the downlink signal DL2 from the base station BS2, priority information of the uplink signal UL1 collected in the QoS information collecting section 105 and reception quality information of the uplink signal UL1 collected in the load information collecting section 102.

Figure 12:
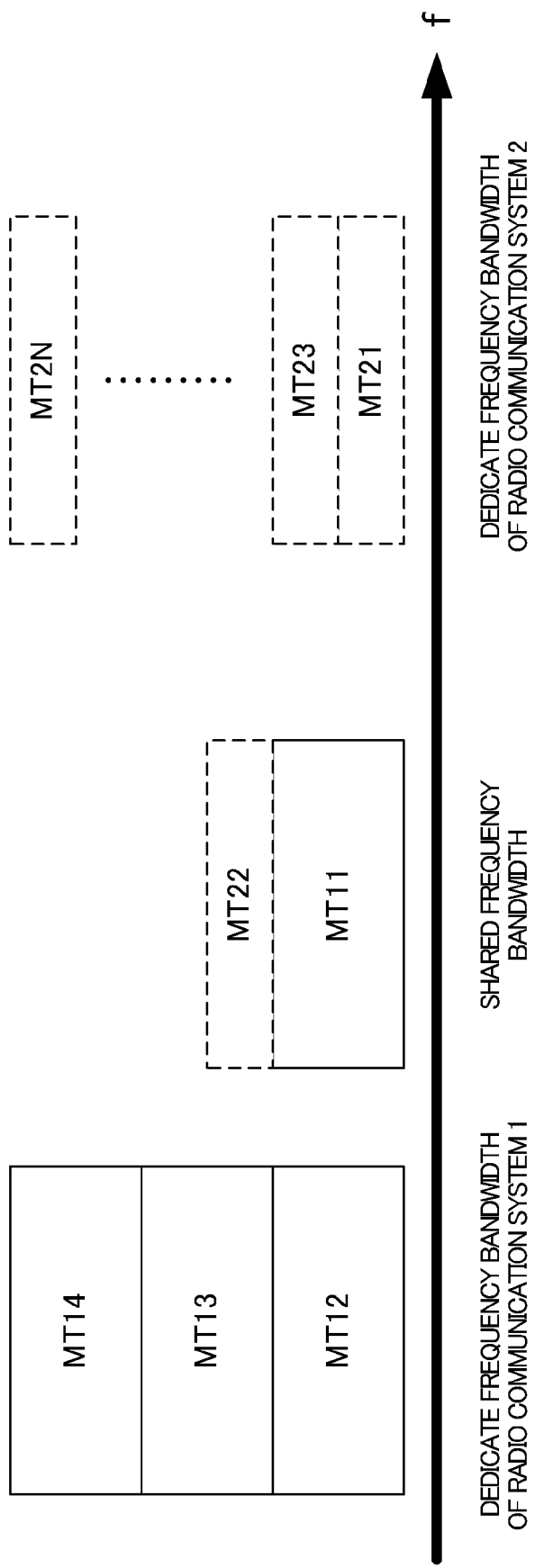
FIG. 12 is a diagram to explain resource allocation control according to Embodiment 3 of the invention.

Herein, the resource allocation control is to switch a frequency band used in transmission of signals between a dedicated frequency band of the radio communication system 1 and a shared frequency band, as shown in FIG. 12. For example, in FIG. 12, the shared frequency band is used as frequency bands of mobile stations MT11 and MT22 hard to receive interference between the radio communication systems 1 and 2 (see FIG. 1), and the dedicated frequency band of the radio communication system 1 is used as frequency bands of mobile stations MT12 and MT21 apt to receive interference between the radio communication systems 1 and 2.

More specifically, when the reception quality of the uplink signal UL1 falls below a predetermined value, the resource allocation control section 106 switches the frequency band of the uplink signal UL1 from the shared frequency band to the dedicated frequency band of the radio communication system 1.

Further, when the priority of the uplink signal UL1 is higher than the priority of the downlink signal DL2, the resource allocation control section 106 may switch the frequency band of the uplink signal UL1 from the shared frequency band to the dedicated frequency band of the radio communication system 1.

The base station BS2 in the radio communication system 2 has a QoS information collecting section 207 and resource allocation control section 208, and in this respect, differs from that in Embodiment 1.

The QoS information collecting section 207 in the base station BS2 collects the priority information in the radio communication system 2, and particularly, in Embodiment 3, collects the priority information of the downlink signal DL2.

The resource allocation control section 208 in the base station BS2 performs resource allocation control of the downlink signal DL2 based on at least one of the priority information of the uplink signal UL1 from the base station BS1, priority information of the downlink signal DL2 collected in the QoS information collecting section 207 and reception quality information of the downlink signal DL2. In addition, the resource allocation control section 208 performs switching control of the frequency band on the downlink signal DL2 as described specifically in the resource allocation control section 106 in the base station BS1.

The frequency band sharing processing according to Embodiment 3 will be described below with reference to FIG. 13. In Embodiment 3, the shared frequency band is shared between the uplink signal UL1 in the radio communication system 1 and the downlink signal DL2 in the radio communication system 2, and the frequency band sharing processing is performed between the base station BS1 (receiving station) in the radio communication system 1 and the base station BS2 (transmitting station) in the radio communication system 2.

Figure 13:
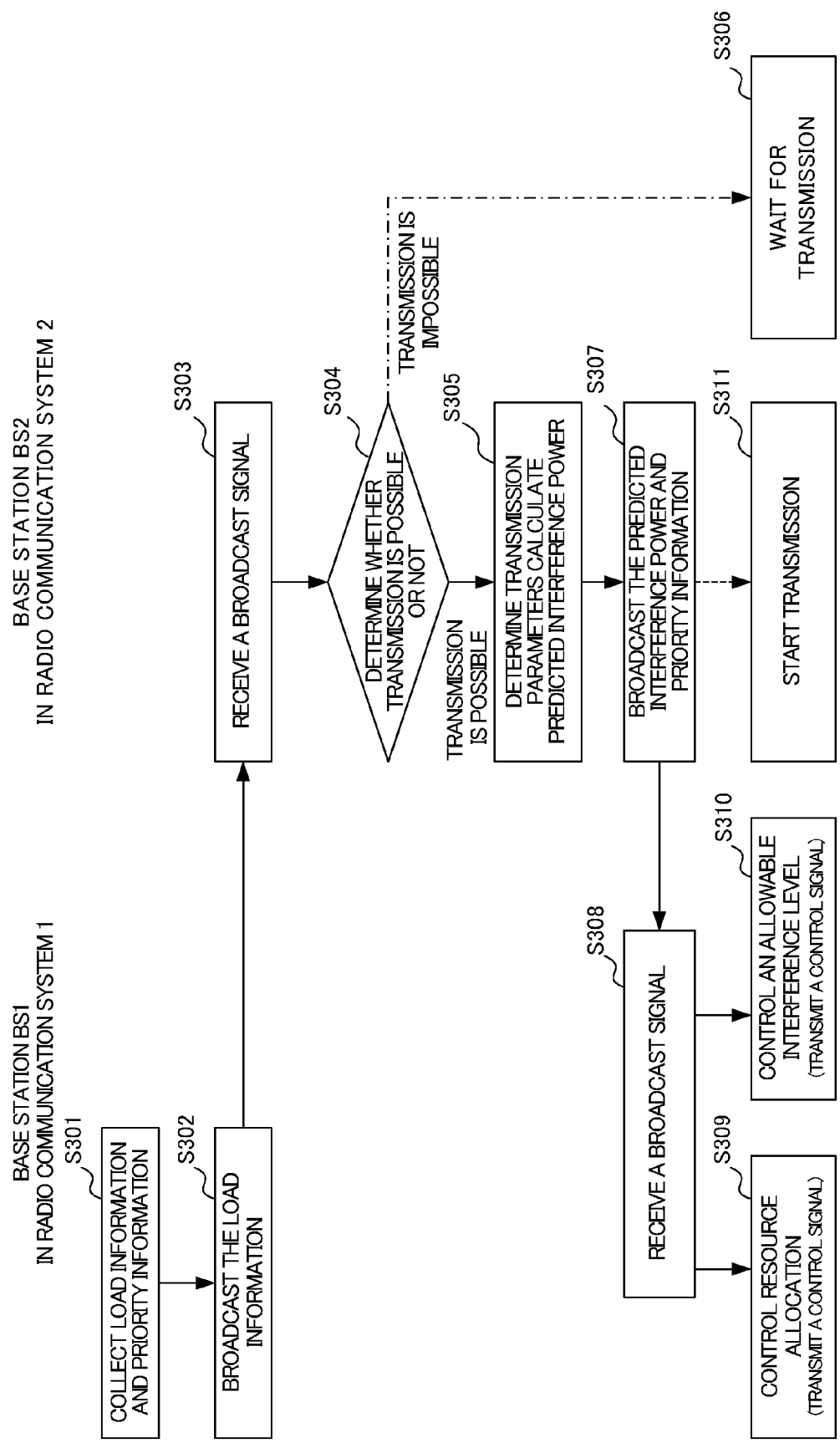
FIG. 13 is a flowchart illustrating frequency band sharing processing according to Embodiment 3 of the invention.

As shown in FIG. 13, the load information collecting section 102 and QoS information collecting section 105 in the base station BS1 respectively collect the load information and priority information of the uplink signal UL1 (step S301). Steps S302 to S306 are the same as steps S102 to S106 in FIG. 4, and descriptions thereof are omitted.

The broadcast signal transmitting/receiving section 201 in the base station BS2 transmits a broadcast signal to the base station BS1. The broadcast signal includes the priority information of the downlink signal DL2, in addition to the predicted interference power caused in the base station BS1 due to transmission of the downlink signal DL2 (step S307). The broadcast signal transmitting/receiving section 103 in the base station BS1 receives the broadcast signal from the base station BS2 (step S308).

The resource allocation control section 106 in the base station BS1 determines whether or not to switch the frequency band of the uplink signal UL1 from the shared frequency band to the dedicated frequency band of the radio communication system 1, based on at least one of the priority information of the downlink signal DL2 included in the broadcast signal, the priority information of the uplink signal UL1 collected in step S301, and the reception quality information of the uplink signal UL1. The resource allocation control section 106 instructs the mobile station MT1 to switch the frequency band of the uplink signal UL1 based on the determination result (step S309). Steps S310 and S311 are the same as steps S109 and S110 in FIG. 4, and descriptions thereof are omitted.

According to the base station BS1 in the radio communication system 1 according to Embodiment 3, when a shared frequency band is shared between the uplink signal UL1 in the radio communication system 1 and the downlink signal DL2 in the radio communication system 2, with respect to the uplink signal UL1 of which signal quality is not improved even by allowable interference level control in the shared frequency band, the frequency band is switched from the shared frequency band to the dedicated frequency band of the radio communication system 1. Therefore, even when interference increases from the downlink signal DL2 transmitted using the shared frequency band, it is possible to improve the quality of the uplink signal UL1 in the radio communication system 1

(Modification 3-1)

Modification 3-1 in Embodiment 3 describes the case where a frequency band is shared between the uplink signal UL1 in the radio communication system 1 and the uplink signal UL2 in the radio communication system 2 (see FIG. 6), while focusing on the difference from Embodiment 3.

In the frequency band sharing processing according to Modification 3-1, the mobile station MT2 is provided with the configuration of the base station BS2 as shown in FIG. 11. In Modification 3-1, the mobile station MT2 (transmitting station) in the radio communication system 2 transmits a broadcast signal including the predicted interference power caused in the base station BS1 due to transmission of the uplink signal UL2 and the priority information of the uplink signal UL2 to the base station BS1 (receiving station) in the radio communication system 1. The base station BS1 instructs the mobile station MT1 to switch the frequency band of the uplink signal UL1 from the shared frequency band to the dedicated frequency band of the radio communication system 1, based on at least one of the priority information of the uplink signal UL2 included in the broadcast signal, the priority information of the uplink signal UL1, and the reception quality information of the uplink signal UL1.

According to the base station BS1 in the radio communication system 1 according to Modification 3-1, with respect to the uplink signal UL1 of which signal quality is not improved even by allowable interference level control in the shared frequency band, the frequency band is switched from the shared frequency band to the dedicated frequency band of the radio communication system 1. Therefore, even when interference increases from the uplink signal UL2 transmitted using the shared frequency band, it is possible to improve the quality of the uplink signal UL1 in the radio communication system 1.

(Modification 3-2)

Modification 3-2 in Embodiment 3 describes the case where a frequency band is shared between the downlink signal DL1 in the radio communication system 1 and the downlink signal DL2 in the radio communication system 2 (see FIG. 7), while focusing on the difference from Embodiment 3.

In the frequency band sharing processing according to Modification 3-2, the base station BS1 (transmitting station) in the radio communication system 1 collects the priority information of the downlink signal DL1, and switches the frequency band of the downlink signal DL1 from the shared frequency band to the dedicated frequency band of the radio communication system 1, based on at least one of the collected priority information of the downlink signal DL1, the reception quality information of the downlink signal DL1, and the priority information of the downlink signal DL2 broadcast from the base station BS2 (transmitting station) in the radio communication system 2.

According to the base station BS1 in the radio communication system 1 according to Modification 3-2, with respect to the downlink signal DL1 of which signal quality is not improved even by allowable interference level control in the shared frequency band, the frequency band is switched from the shared frequency band to the dedicated frequency band of the radio communication system 1. Therefore, even when interference increases from the downlink signal DL2 transmitted using the shared frequency band, it is possible to improve the quality of the downlink signal DL1 in the radio communication system 1.

(Modification 3-3)

Modification 3-3 in Embodiment 3 describes the case where a frequency band is shared between the downlink signal DL1 in the radio communication system 1 and the uplink signal UL2 in the radio communication system 2 (see FIG. 8). In the frequency band sharing processing according to Modification 3-3, the mobile station MT2 is provided with the configuration of the base station BS2 as shown in FIG. 11. The mobile station MT2 (transmitting station) performs the same processing as in Modification 3-1. Further, the base station BS1 (transmitting station) performs the same processing as in Modification 3-2.

According to the base station BS1 in the radio communication system 1 according to Modification 3-3, with respect to the downlink signal DL1 of which signal quality is not improved even by allowable interference level control in the shared frequency band, the frequency band is switched to the dedicated frequency band of the radio communication system 1. Therefore, even when interference increases from the uplink signal UL2 transmitted using the shared frequency band, it is possible to improve the quality of the downlink signal DL1 in the radio communication system 1.

Embodiment 4

Figure 14:
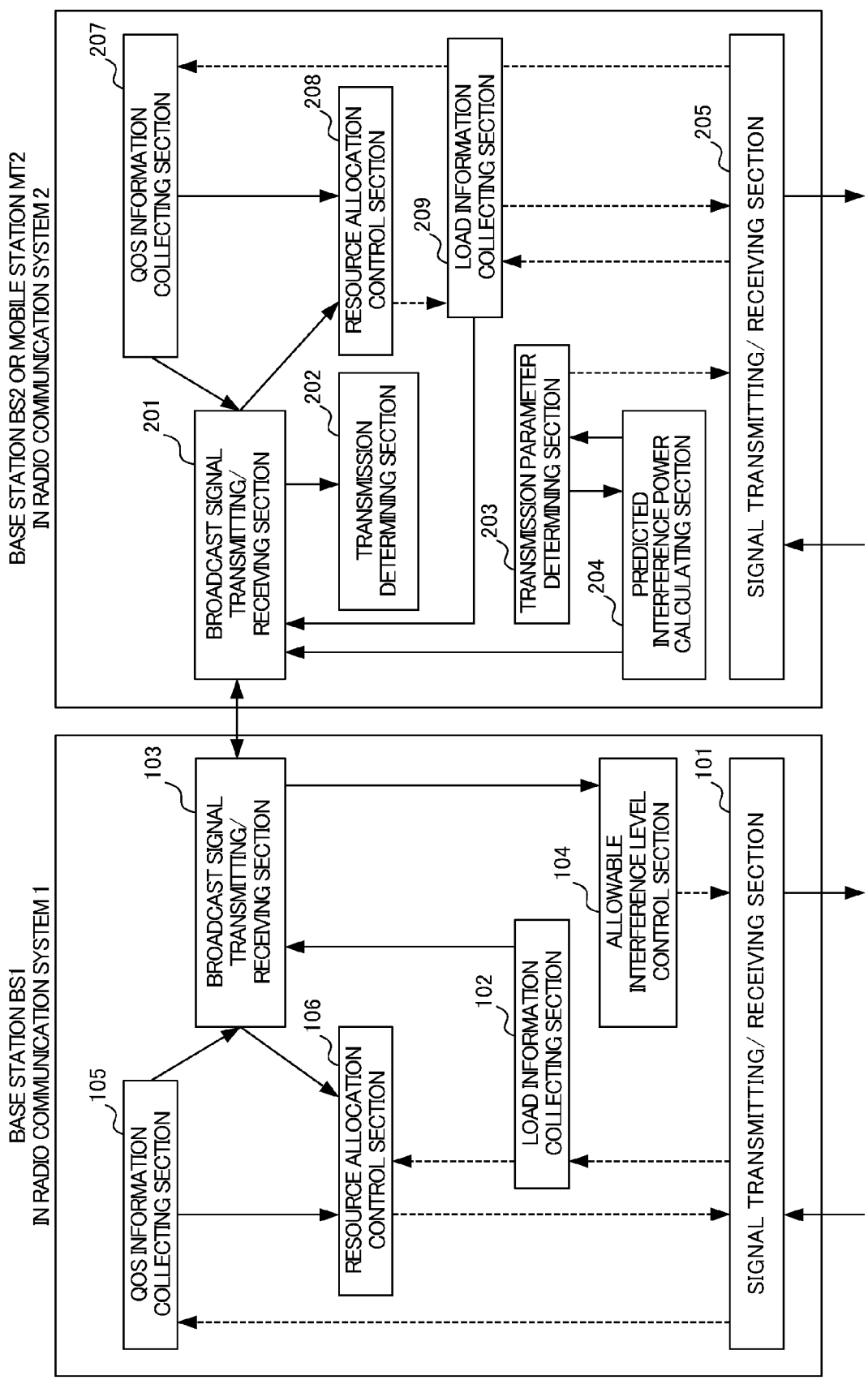
FIG. 14 is a configuration diagram of a base station or mobile station according to Embodiment 4 of the invention.

Referring to FIG. 14, the base station BS2 in the radio communication system 2 according to Embodiment 4 of the invention will be described below, while focusing on differences from those in Embodiment 3 and Modifications 3-1 to 3-3.

In Embodiment 4, when a shared frequency band is used in the downlink signal DL2 in the radio communication system 2, the base station BS2 (transmitting station) has a load information collecting section 209. When a shared frequency band is used in the uplink signal UL2, the mobile station MT2 (transmitting station) has the load information collecting section 209.

The load information collecting section 209 collects the load information of the radio communication system 2. More specifically, the load information collecting section 209 in the base station BS2 collects the load information of the downlink signal DL2, when the shared frequency band is used in the downlink signal DL2 in the radio communication system 2. Meanwhile, the load information collecting section 209 in the mobile station MT2 collects the load information of the uplink signal UL2, when the shared frequency band is used in the uplink signal UL2 in the radio communication system 2.

The broadcast signal transmitting/receiving section 201 transmits, to the base station BS1 in the radio communication system 1, a broadcast signal including the load information of the radio communication system 2 collected in the load information collecting section 209, in addition to the predicted interference power calculated in the predicted interference power calculating section 204 and the priority information collected in the QoS information collecting section 207.

The resource allocation control section 106 in the base station BS1 performs the resource allocation control of the uplink signal UL1 or downlink signal DL1 using the shared frequency band, based on at least one of the priority information of the downlink signal DL2 or uplink signal UL2 broadcast from the base station BS2 or mobile station MT2, the load information of the radio communication system 2, and the priority information of the uplink signal UL1 or downlink signal DL1 collected in the QoS information collecting section 105.

For example, when the broadcast load on the radio communication system 2 falls below a predetermined value, the resource allocation control section 106 switches the frequency band of the uplink signal UL1 or downlink signal DL1 using the shared frequency band to the dedicated frequency band of the radio communication system 1.

According to the base station BS2 or mobile station MT2 in the radio communication system 2 according to Embodiment 4, the load information of the radio communication system 2 is broadcast to the base station BS1 in the radio communication system 1, and in accordance with the load information of the radio communication system 2, the base station BS1 switches the frequency band of the uplink signal UL1 or downlink signal DL1 using the shared frequency band to the dedicated frequency band of the radio communication system 1. Therefore, it is possible to reduce the interference to the radio communication system 2 by the uplink signal UL1 or downlink signal DL1 transmitted using the shared frequency band, and to improve the signal quality in the radio communication system 2.

Embodiment 5

Figure 15:
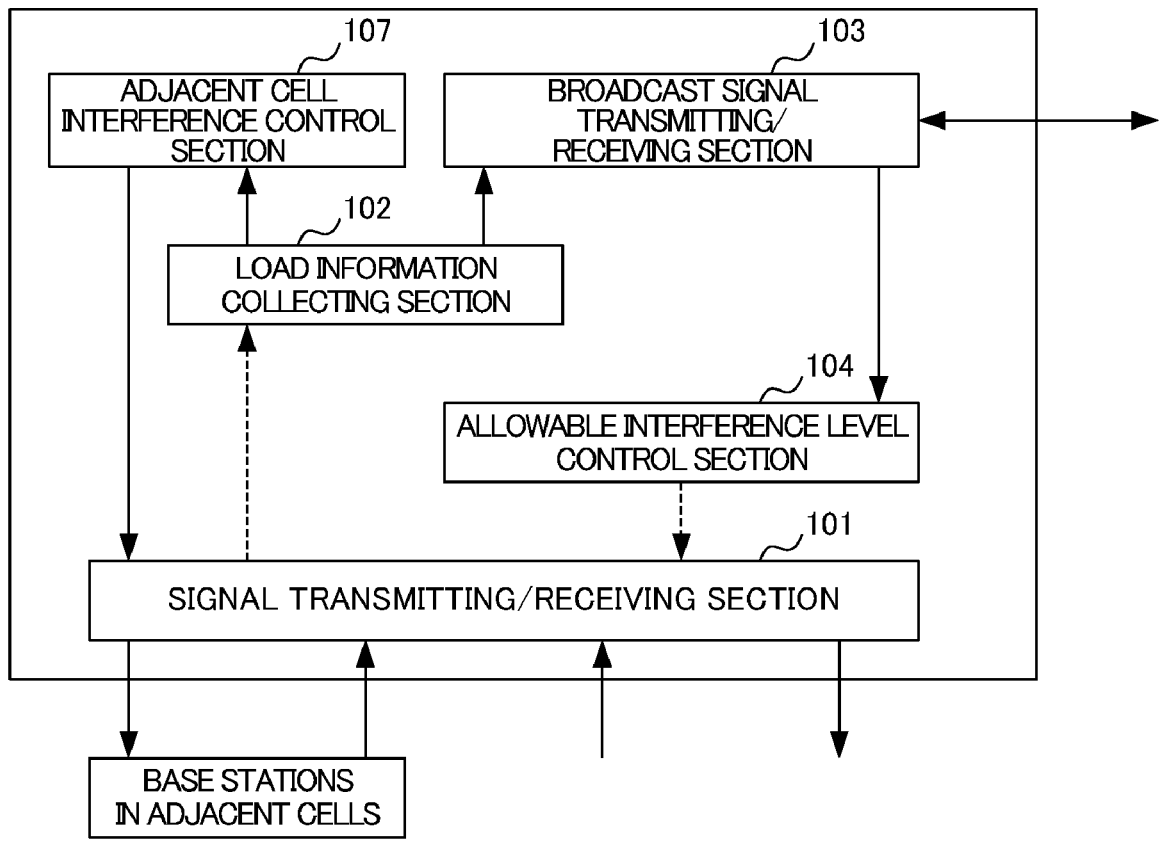
FIG. 15 is a configuration diagram of a base station according to Embodiment 5 of the invention.

Referring to FIG. 15, described next is the base station BS1 in the radio communication system 1 according to Embodiment 5 of the invention. The base station BS1 according to Embodiment 5 is only applied to the case that a share frequency band is used in the downlink signal DL1. Accordingly, Embodiment 5 describes the case that the shared frequency band is shared between the downlink signal DL1 in the radio communication system 1 and the uplink signal UL2 or downlink signal DL2 in the radio communication system 2 (see FIG. 7 or 8).

As shown in FIG. 15, the base station BS1 (receiving station) in the radio communication system 1 has an adjacent cell interference control section 107. The adjacent cell interference control section 107 performs adjacent cell interference control of a cell C1 of the base station BS1 based on the predicted interference power broadcast from the base station BS2. The adjacent cell interference control is control to reduce the interference power caused in the mobile station MT1 in the cell C1 by cells adjacent to cell C1 of the base station BS1. More specifically, the adjacent cell interference control section 107 instructs base stations in cells adjacent to the cell C1 to restrict the load on the downlink signal.

Figure 16:
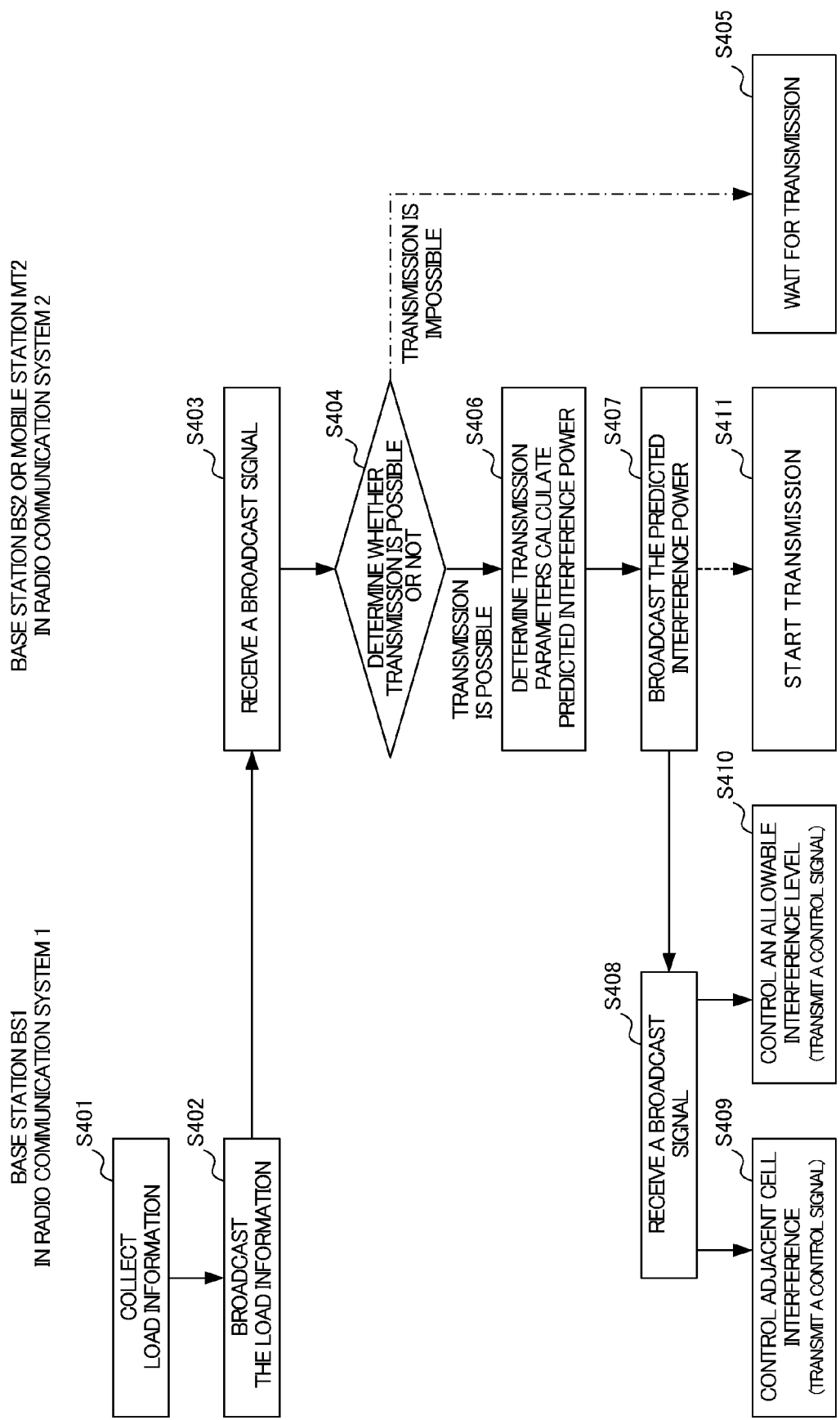
FIG. 16 is a flowchart illustrating frequency band sharing processing according to Embodiment 5 of the invention.

The frequency band sharing processing according to Embodiment 5 will be described below with reference to FIG. 16. In Embodiment 5, as described above, the frequency band of the downlink signal DL1 in the radio communication system 1 is the shared frequency band, and the frequency band sharing processing is performed between the base station BS1 (receiving station) in the radio communication system 1 and the base station BS2 or mobile station MT2 (transmitting station) in the radio communication system 2. In addition, steps S401 to S408 are the same as steps S101 to S108 in FIG. 4, and descriptions thereof are omitted.

As described above, the adjacent cell interference control section 107 in the base station BS1 instructs base stations in cells adjacent to the cell C1 to restrict the load on the downlink signal, based on the predicted interference power broadcast from the base station BS2 or mobile station MT2 (step S409). Steps S410 and S411 are the same as steps S109 and S110 in FIG. 4, and descriptions thereof are omitted.

According to the base station BS1 in the radio communication system 1 according to Embodiment 5, when the frequency band of the downlink signal DL1 in the radio communication system 1 is the shared frequency band, adjacent cell interference control is performed on base stations in cells adjacent to the cell C1 of the base station BS1 based on the predicted interference power broadcast from the base station BS2. Therefore, it is possible to prevent the signal quality of the downlink signal DL1 from deteriorating due to interference from the adjacent cells, and to enhance the allowable interference level of the downlink signal DL1 against interference from the radio communication system 2.

Embodiment 6

Figure 17:
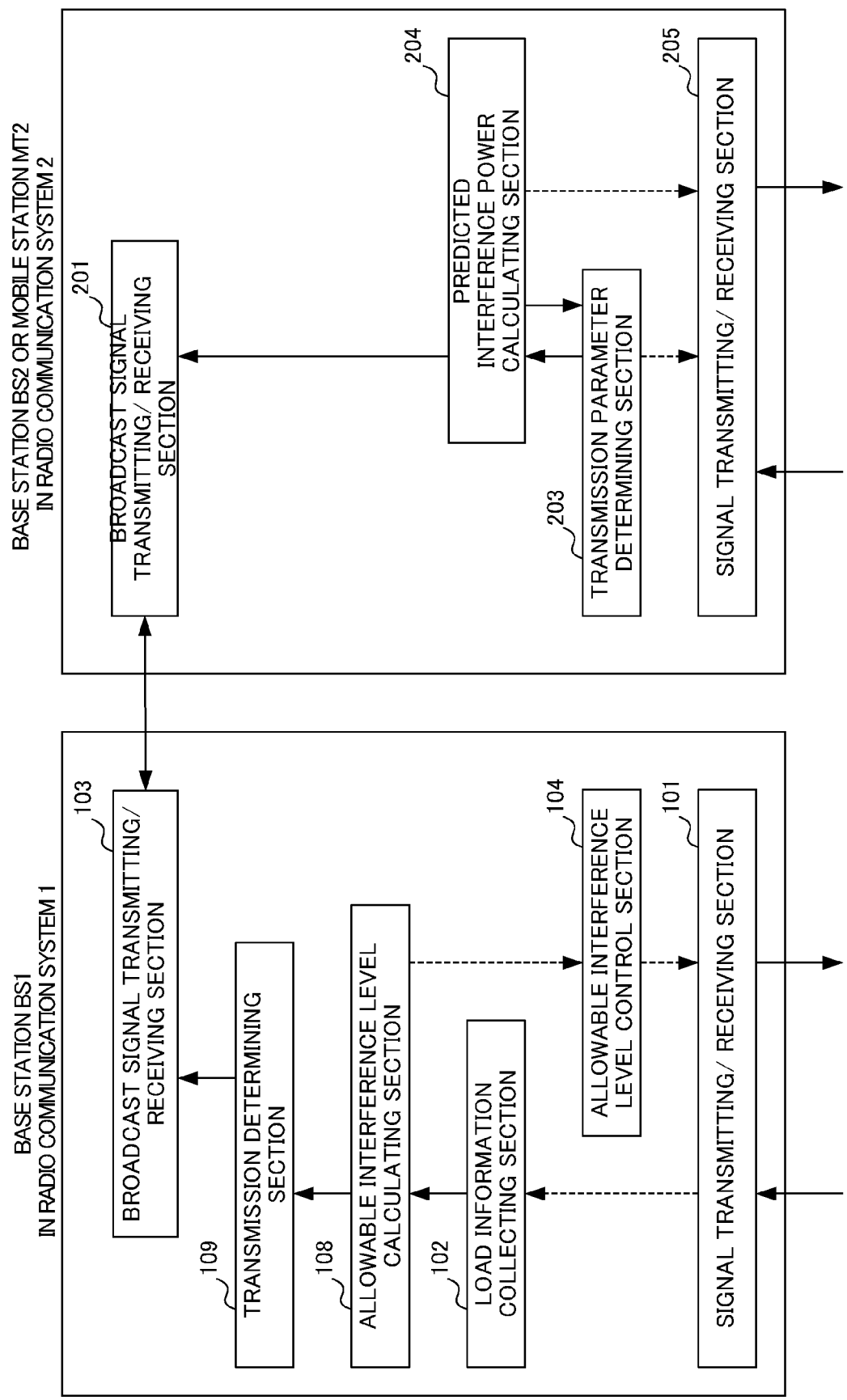
FIG. 17 is a configuration diagram of a base station according to Embodiment 6 of the invention.

Referring to FIG. 17, the base station BS1 in the radio communication system 1 according to Embodiment 6 of the invention will be described below, while focusing on differences from those in Embodiment 1 and Modifications 1-1 to 1-3.

Embodiment 6 collectively describes the case that a frequency band is shared between the uplink signal UL1 or downlink signal DL1 in the radio communication system 1 and the uplink signal UL2 or downlink signal DL2 in the radio communication system 2 (see FIGS. 5 to 8).

In Embodiment 6, when the frequency band of the downlink signal DL2 in the radio communication system 2 is the shared frequency band (see FIGS. 5 and 7), the base station BS1 in the radio communication system 1 performs the determination whether transmission of the downlink signal DL2 is possible or not, although the determination is performed by the base station BS2 in the radio communication system2 in above Embodiment. Further, in Embodiment 6, when the frequency band of the uplink signal UL2 in the radio communication system 2 is the shared frequency band (see FIGS. 6 and 8), the base station BS1 in the radio communication system 1 performs the determination on whether or not transmission of the uplink signal UL2 is possible or not, although the determination is performed by the mobile station MT2 in the radio communication system 2 in above Embodiment.

As shown in FIG. 7, the base station BS1 in the radio communication system 1 has an allowable interference level calculating section 108 and transmission determining section 109.

The allowable interference level calculating section 108 calculates an allowable interference level margin in the radio communication system 1 based on the load information of the radio communication system 1 collected in the load information collecting section 102.

The transmission determining section 109 determines whether transmission of the uplink signal UL2 or downlink signal DL2 using the shared frequency band is possible or not in the radio communication system 2, based on the predicted interference power broadcast from the base station BS2.

More specifically, the transmission determining section 109 determines that it is possible to transmit the uplink signal UL2 or the downlink signal DL2 using the shared frequency band, when the allowable interference level margin calculated in the allowable interference level calculating section 108 is the predicted interference power broadcast from the base station BS2 or more. Meanwhile, the transmission determining section 109 determines that it is impossible to transmit the uplink signal UL2 or the downlink signal DL2 using the shared frequency band, when the allowable interference level margin calculated in the allowable interference level calculating section 108 is less than the predicted interference power broadcast from the base station BS2.

Figure 18:
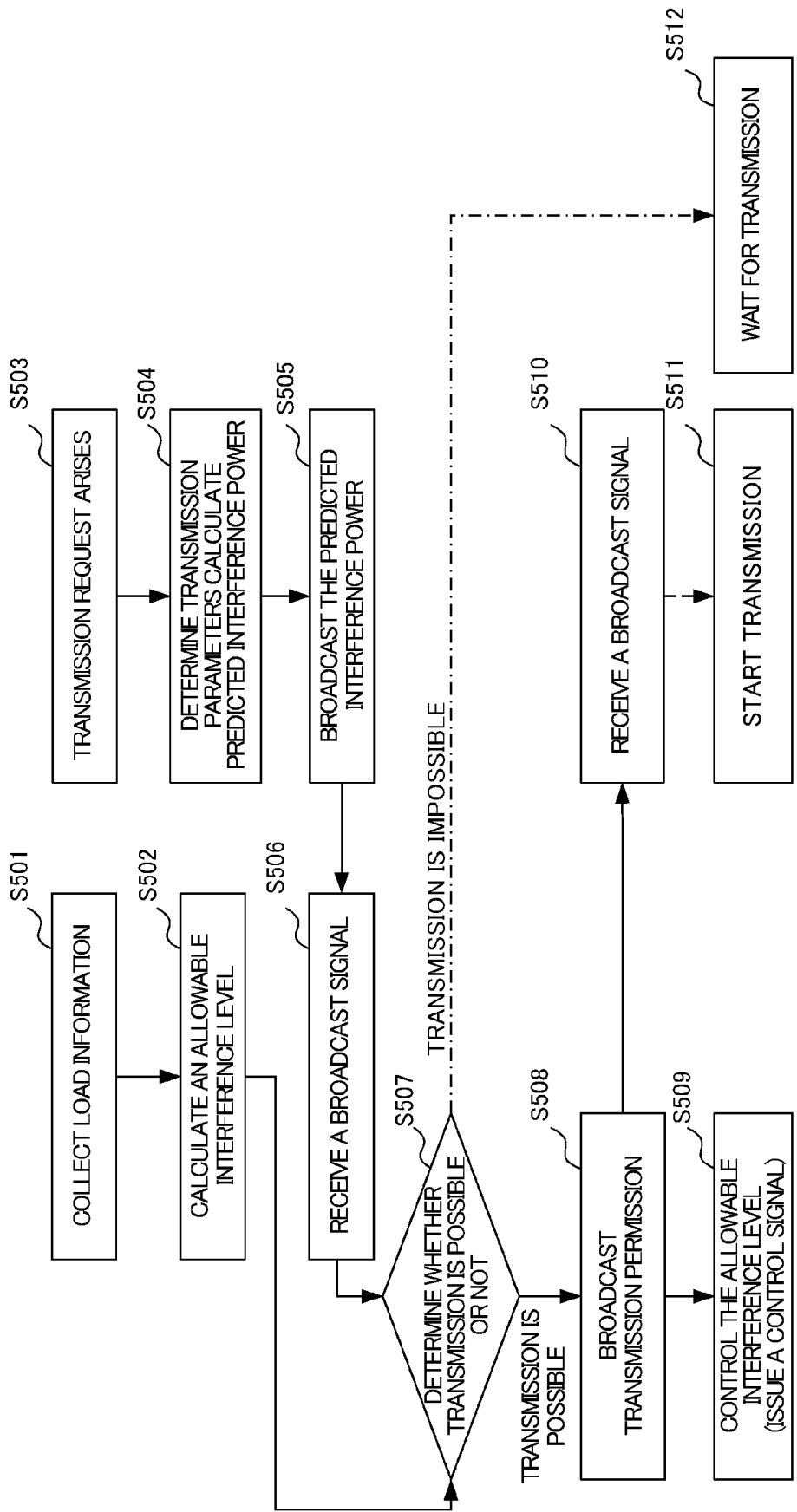
FIG. 18 is a flowchart illustrating frequency band sharing processing according to Embodiment 6 of the invention.

Referring to FIG. 18, described next is the frequency band sharing processing according to Embodiment 6. In Embodiment 6, as described above, corresponding to whether the shared frequency band is the frequency band of the downlink signal DL2 or uplink signal UL2 in the radio communication system 2, the frequency band sharing processing is performed between the base station BS1 in the radio communication system 1 and the base station BS2 or mobile station MT2 in the radio communication system 2.

The load information collecting section 102 in the base station BS1 collects the load information of the uplink signal UL1 or downlink signal DL1 using the shared frequency band (step S501)

The allowable interference level calculating section 108 in the base station BS1 calculates an allowable interference level margin in the radio communication system 1, based on the load information of the radio communication system 1 collected in the load information collecting section 102 (step S502)

In the base station BS2 or mobile station MT2, a transmission request is made for the downlink signal DL2 or uplink signal UL2 (step S503).

The transmission parameter determining section 203 in the base station BS2 or mobile station MT2 determines the transmission power of the downlink signal DL2 or uplink signal UL2. The predicted interference power calculating section 204 calculates the predicted interference power caused in the base station BS1 or mobile station MT1 by the downlink signal DL2 or uplink signal UL2 to be transmitted using the shared frequency band, based on the transmission power determined in the transmission parameter determining section 203 (step S504).

The broadcast signal transmitting/receiving section 201 in the base station BS2 or mobile station MT2 transmits a broadcast signal including the calculated predicted interference power to the base station BS1 (step S505). The broadcast signal transmitting/receiving section 103 in the base station BS1 receives the broadcast signal including the predicted interference power (step S506).

The transmission determining section 109 in the base station BS1 determines whether transmission of the downlink signal DL2 or uplink signal UL2 using the shared frequency band is possible or not in the radio communication system 2. More specifically, it is determined whether or not the allowable interference level margin calculated in step S502 is the predicted interference power broadcast in step S506 or more (step S507).

When it is determined that transmission of the downlink signal DL2 or uplink signal UL2 is possible, the broadcast signal transmitting/receiving section 103 in the base station BS1 transmits a broadcast signal including transmission permission of the downlink signal DL2 or uplink signal UL2 (step S508). The allowable interference level control section 104 in the base station BS1 increases an allowable interference level of the uplink signal UL1 or downlink signal DL1 (step S509).

The broadcast signal transmitting/receiving section 201 in the base station BS2 or mobile station MT2 receives the broadcast signal including transmission permission of the downlink signal DL2 or uplink signal UL2 (step S510).

When the transmission permission of the downlink signal DL2 or uplink signal UL2 is received, the signal transmitting/receiving section 205 in the base station BS2 or mobile station MT2 transmits the downlink signal DL2 or uplink signal UL2 according to transmission parameters determined in step S504 (step S511).

Meanwhile, when the transmission permission of the downlink signal DL2 or uplink signal UL2 is not received, the base station BS2 or mobile station MT2 waits for transmission of the downlink signal DL2 or uplink signal UL2 (step S512).

According to the base station BS1 in the radio communication system 1 according to Embodiment 6, instead of the base station BS2 or mobile station MT2 in the radio communication system 2, the base station BS1 determines whether transmission of the downlink signal DL2 or uplink signal UL2 using the shared frequency band is possible or not. Therefore, it is possible to reduce the processing load on the base station BS2 that transmits the downlink signal DL2 or the mobile station MT2 that transmits the uplink signal UL2 using the shared frequency band in the radio communication system 2.

Embodiment 7

Figure 19:
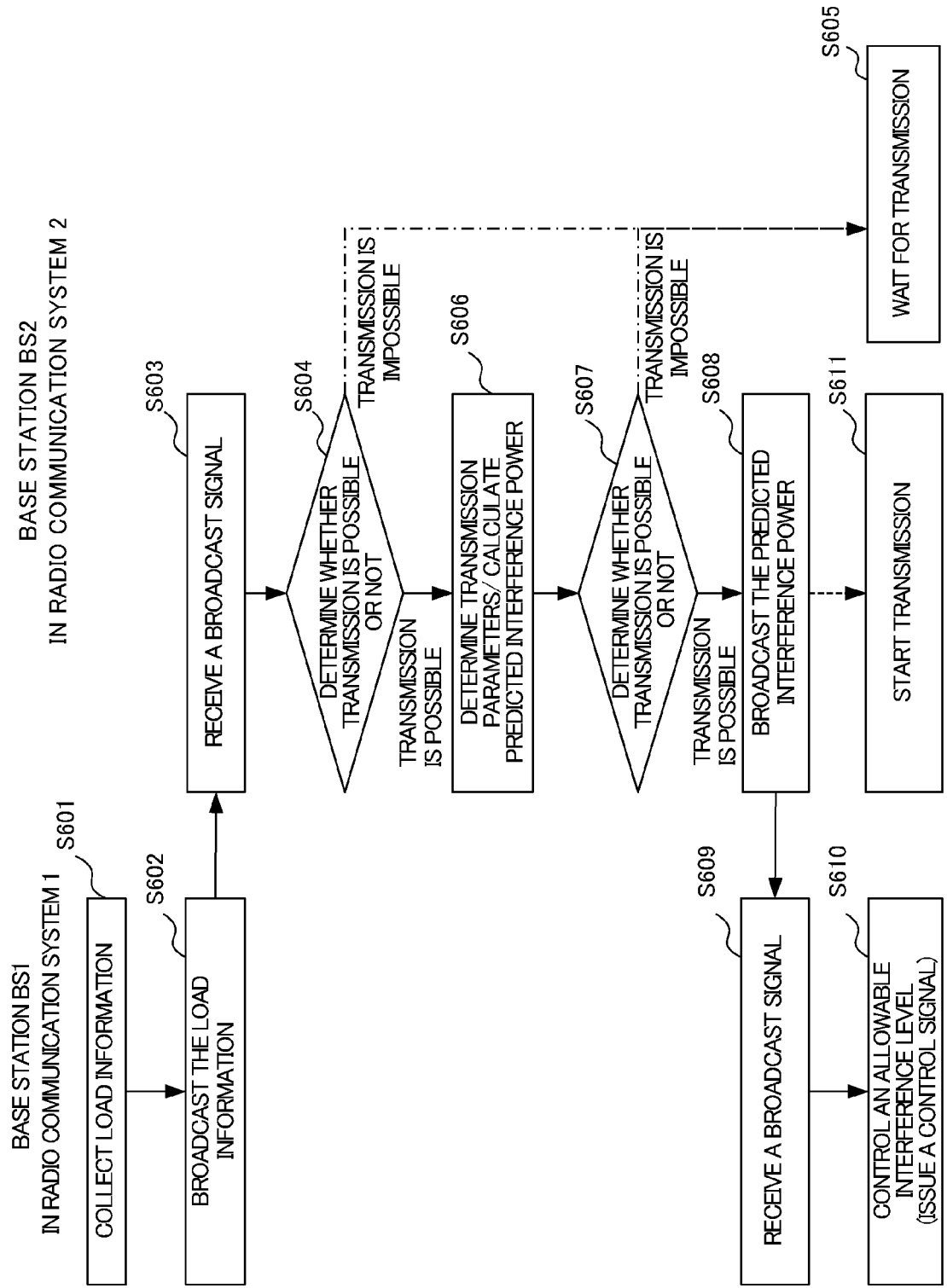
FIG. 19 is a flowchart illustrating frequency band sharing processing according to Embodiment 7 of the invention.

Referring to FIG. 19, the base station BS2 in the radio communication system 2 according to Embodiment 7 of the invention will be described below, while focusing on differences from those in Embodiment 1 and Modifications 1-1 to 1-3.

Embodiment 7 collectively describes the case that a frequency band is shared between the uplink signal UL1 or downlink signal DL1 in the radio communication system 1 and the uplink signal UL2 or downlink signal DL2 in the radio communication system 2 (see FIGS. 5 to 8). As described above, when the frequency band of the downlink signal DL2 is the shared frequency band (see FIGS. 5 and 7), the above-mentioned configuration of the transmission determining section 202, etc is provided in the base station BS1 (transmitting station), while being provided in the mobile station MT2 when the frequency band of the uplink signal UL2 is the shared frequency band (see FIGS. 6 and 8).

As shown in FIG. 19, the transmission determining section 202 determines whether or not the allowable interference level margin in the radio communication system 1 that is estimated based on the load information from the base station BS1 is a predetermined value or more (step S604), as described in above-mentioned Embodiments 1 to 6.

In addition to the first determination whether the transmission is possible or not in step S604, the transmission determining section 202 makes a second determination whether the transmission is possible or not based on comparison between the predicted interference power calculated in the predicted interference power calculating section 204 and the allowable interference level margin in the radio communication system 1 (step S607). More specifically, the transmission determining section 202 determines that it is possible to transmit the downlink signal DL2 or uplink signal UL2, when the allowable interference level margin is the predicted interference power or more, while determining that it is not possible to transmit the downlink signal DL2 or the uplink signal UL2, when the allowable interference level margin is not more than the predicted interference power.

According to the base station BS2 or mobile station MT2 in the radio communication system 2 according to Embodiment 7, as well as the first determination whether transmission of the downlink signal DL2 or uplink signal UL2 is possible or not, the base station BS2 or mobile station MT2 makes the second determination whether the transmission is possible or not based on comparison between the allowable interference level margin in the radio communication system 1 and the predicted interference power. Therefore, even when the allowable interference level margin in the radio communication system 1 has an allowance to some extent, in the case where the predicted interference power from the downlink DL2 or uplink UL2 to be transmitted using the shared frequency band exceeds the allowable interference level margin (for example, in the case where a receiver in the radio communication system 1 and a transmitter in the radio communication system 2 exist in mutually close positions), it is possible to prevent the deterioration of the quality of the uplink signal UL1 or downlink signal DL1 using the shared frequency band in the radio communication system 1.

Other Embodiments

In Embodiments 1 to 5 and corresponding Modifications, the transmission parameter determining section 203 determines the transmission power of the downlink signal DL2 or uplink signal UL2 using the shared frequency band, not based on the allowable interference level margin in the radio communication system 1, but may determine the transmission power not to exceed the allowable interference level margin in the radio communication system 1. According to such a method, it is possible to use the allowable interference level margin of the radio communication system 1 to the limit such that the radio communication system 2 is capable of using.

In Embodiment 3 and Modifications 3-1 to 3-3, it is described that the resource allocation control section 106 of the base station BS1 in the radio communication system 1 as shown in FIG. 11 performs the resource allocation control of the uplink signal UL1 (or the downlink signal DL1) in the radio communication system 1, based on at least one of the priority information of the downlink signal DL2 (or the uplink signal UL2) in the radio communication system 2, the priority information of the uplink signal UL1 (or downlink signal DL1) in the radio communication system 1, and the reception quality information of the uplink signal UL1 (or downlink signal DL1) in the radio communication system 1. However, the resource allocation control section 106 may perform the resource allocation control in the radio communication system 1 based on ease of undergoing interference from the transmitting station in the radio communication system 2, as a substitute for the above-mentioned priority information.

For example, the resource allocation control section 106 may perform the resource allocation control in the radio communication system 1 based on an estimation result of the channel state between the receiving station (base station BS1 or mobile station MT1) receiving the signal using the shared frequency band in the radio communication system 1 and the transmitting station (base station BS2 or mobile station MT2) transmitting the signal using the shared frequency band in the radio communication system 2. Similarly, the resource allocation control section 208 in the base station BS2 (or the mobile station MT2) in the radio communication system 2 as shown in FIG. 11 may perform the resource allocation control in the radio communication system 2 based on an estimation result of the channel state as described above. In addition, as described in Embodiment 2 and Modifications 2-1 to 2-3, the above-mentioned channel state is capable of being estimated by the channel state estimating section 206 as shown in FIG. 9.

In Embodiment 7, as shown in FIG. 19, the first determination (step S604) and second determination (step S607) are made on whether transmission of the downlink signal DL2 or uplink signal UL2 using the shared frequency band is possible or not, but only the second determination may be made without making the first determination.

In the above-mentioned Embodiments and corresponding Modifications, it is described that the base station BS1 performs the allowable interference level control in both of the case that the shared frequency band is used on the uplink UL1 in the radio communication system 1 (see FIGS. 5 and 6) and the case that the shared frequency band is used on the downlink DL1 in the radio communication system 1 (see FIGS. 7 and 8). However, the receiving station receiving the signal using the shared frequency band in the radio communication system 1 may perform the allowable interference level control. More specifically, it is possible to adopt the configuration that the base station BS1 performs the allowable interference level control, as described above, when the shared frequency band is used on the uplink UL1 in the radio communication system 1, and that the mobile station MT1 performs the allowable interference level control when the shared frequency band is used on the downlink DL1 in the radio communication system 1.

When the shared frequency band is used on the downlink DL1 in the radio communication system 1 and the mobile station MT1 performs the allowable interference level control, the mobile station MT1 is provided with the configuration of the base station BS1 as shown in FIG. 2. In this case, the load information collecting section 102 in the mobile station MT1 collects the load information (for example, the traffic amount of the downlink signal DL1, reception quality information of the downlink signal DL1, etc.). The broadcast signal transmitting/receiving section 103 in the mobile station MT1 broadcasts the signal to the transmitting station (base station BS2 or mobile station MT2) that transmits the signal using the shared frequency band in the radio communication system 2. The allowable interference level control section 104 in the mobile station MT1 increases the allowable interference level of the downlink signal DL1 transmitted using the shared frequency band, based on the predicted interference power broadcast from the transmitting station. More specifically, the mobile station MT2 instructs the base station BS1 to increase the transmission power of the downlink signal DL1 or decrease a transmission rate of the downlink signal DL1, based on the broadcast predicted interference power.

Further, it is possible to combine configurations of Embodiments 1 to 5, Embodiment 7 and other Embodiments. Furthermore, the present invention is not limited to the above-mentioned Embodiments, and is capable of being carried into practice with various modifications thereof. For example, processing sections and processing procedures are capable of being carried into practice with various modifications thereof as appropriate without departing from the scope of the invention. Moreover, the invention is capable of being carried into practice with various modifications thereof as appropriate without departing from the scope of the invention.

What is claimed is:

1. A transmitting station for transmitting a second radio communication system signal to a receiving station in a second radio communication system, using a shared frequency band which a first radio communication system uses in priority to the second radio communication system, comprising:
    an acquisition section that acquires load information of the first radio communication system;
    a transmission determining section that estimates, based on the load information acquired in the acquisition section, an allowable interference level margin defined by a difference between an allowable interference level of a first radio communication system signal transmitted using the shared frequency band and a current interference level of the first radio communication system signal, and determines whether transmission of the second radio communication system signal using the shared frequency band is possible or not, based on whether or not the estimated allowable interference level margin is a predetermined value or more;
    a predicted interference power calculating section that calculates predicted interference power caused in a receiving station in the first radio communication system by the second radio communication system signal transmitted using the shared frequency band; and
    a broadcast section that broadcasts the predicted interference power calculated in the predicted interference power calculating section to the first radio communication system.

2. The transmitting station according to claim 1, further comprising:
    a channel state estimating section that estimates a channel state between the receiving station in the first radio communication system and the transmitting station,
    wherein the transmission determining section determines whether or not a transmitting station transmitting the first radio communication system signal exists near the transmitting station for transmitting the second radio communication system signal based on the channel state, and determines that transmission of the second radio communication system signal using the shared frequency band is impossible, when the transmitting station transmitting the first radio communication system signal exists near the transmitting station for transmitting the second radio communication system signal even in a case where the estimated allowable interference level margin is a predetermined value or more.

3. The transmitting station according to claim 1, wherein the broadcast section broadcasts priority information of the second radio communication system signal transmitted using the shared frequency band, in addition to the predicted interference power.

4. The transmitting station according to claim 3, wherein the broadcast section broadcasts load information of the second radio communication system, in addition to the predicted interference power and the priority information.

5. A frequency band sharing method in which a first radio communication system and a second radio communication system share a shared frequency band which the first radio communication system uses in priority to the second radio communication system, comprising:
    broadcasting, in a radio station in the first radio communication system, load information of the first radio communication system to a transmitting station in the second radio communication system;
    estimating, in a transmitting station in the second radio communication system, based on load information acquired in an acquisition section of the transmitting station, an allowable interference level margin defined by a difference between an allowable interference level of a first radio communication system signal transmitted using the shared frequency band and a current interference level of the first radio communication system signal, determining, in the transmitting station in the second radio communication system, whether transmission of a second radio communication system signal from the transmitting station using the shared frequency band is possible or not, based on whether or not the estimated allowable interference level margin is a predetermined value or more;

calculating, in the transmitting station in the second radio communication system, predicted interference power caused in a receiving station in the first radio communication system by the second radio communication system signal transmitted using the shared frequency band;

broadcasting, in the transmitting station in the second radio communication system, the calculated predicted interference power to the radio station in the first radio communication system;

increasing, in the radio station in the first radio communication system, an allowable interference level of a first radio communication system signal transmitted using the shared frequency band, based on the broadcast predicted interference power; and increasing transmission power of the first radio communication system signal or decreasing a transmission rate of the first radio communication system signal in an allowable interference level control section, so that signal quality of the first radio communication system signal can be maintained even when a receiving station in the first radio communication system receives the predicted interference power by the second radio communication system signal.

\* \* \* \* \*